United States Patent
Heath et al.

(10) Patent No.: US 9,928,764 B2
(45) Date of Patent: Mar. 27, 2018

(54) ILLUMINATED SUPPORT MOUNT FOR VEHICLE FLAG

(71) Applicants: Charles M. Heath, Seneca, SC (US); Eric M. Heath, Knoxville, TN (US); Theodore G. Yaksich, Seneca, SC (US)

(72) Inventors: Charles M. Heath, Seneca, SC (US); Eric M. Heath, Knoxville, TN (US); Theodore G. Yaksich, Seneca, SC (US)

( * ) Notice: Subject to any disclaimer, the term of this patent is extended or adjusted under 35 U.S.C. 154(b) by 216 days.

(21) Appl. No.: 14/838,481

(22) Filed: Aug. 28, 2015

(65) Prior Publication Data

US 2016/0063904 A1 Mar. 3, 2016

Related U.S. Application Data

(60) Provisional application No. 62/043,546, filed on Aug. 29, 2014.

(51) Int. Cl.
*G09F 17/00* (2006.01)
*B60Q 1/26* (2006.01)
*G09F 13/22* (2006.01)

(52) U.S. Cl.
CPC .......... *G09F 17/00* (2013.01); *B60Q 1/268* (2013.01); *B60Q 1/2657* (2013.01); *G09F 2013/222* (2013.01); *G09F 2017/0075* (2013.01)

(58) Field of Classification Search
CPC .. G09F 17/00; G09F 21/04; G09F 2017/0075; G09F 23/04
See application file for complete search history.

(56) References Cited

U.S. PATENT DOCUMENTS

| | | | |
|---|---|---|---|
| 3,305,961 A | 3/1966 | Lanzon et al. | |
| 4,633,215 A * | 12/1986 | Anders | B60Q 1/486 116/173 |
| 4,833,443 A | 5/1989 | Siew | |
| 5,089,803 A | 2/1992 | Bohn | |
| 5,233,938 A | 8/1993 | Lalo | |
| 5,786,758 A * | 7/1998 | Bullock | B60Q 1/482 116/202 |
| 6,129,035 A | 10/2000 | Schweinberger | |
| 6,203,181 B1 * | 3/2001 | Gross | B60Q 1/482 362/486 |
| 6,955,456 B2 | 10/2005 | Schroeder | |
| 7,066,105 B2 | 6/2006 | Tal | |
| D546,242 S * | 7/2007 | Strader | D11/165 |
| 7,293,523 B1 | 11/2007 | Lentz | |
| 7,385,526 B1 * | 6/2008 | Bullard | B60Q 1/2657 340/425.5 |
| 7,699,508 B2 | 4/2010 | Schroeder | |
| 7,878,138 B2 | 2/2011 | Karnes et al. | |
| 8,146,278 B1 * | 4/2012 | Grant | G09F 13/10 116/174 |
| 8,430,052 B2 | 4/2013 | Nihra et al. | |
| 2004/0083633 A1 | 5/2004 | Mueller | |

(Continued)

FOREIGN PATENT DOCUMENTS

EP 2 178 071 4/2010

*Primary Examiner* — Andrew Coughlin

(57) ABSTRACT

An illuminated support mount for a vehicle flag may include a base, a power input jack disposed outwardly of the base, a mast connected to the base, and a light source disposed within the mast and electrically connected to the power input jack.

20 Claims, 15 Drawing Sheets

(56) References Cited

U.S. PATENT DOCUMENTS

| | | | |
|---|---|---|---|
| 2005/0237165 A1* | 10/2005 | Shimoni | B60R 13/00 340/425.5 |
| 2006/0092652 A1* | 5/2006 | Lau | B60Q 1/268 362/503 |
| 2007/0089338 A1* | 4/2007 | Barnhouse | G09F 17/00 40/604 |
| 2010/0160057 A1 | 6/2010 | Willett | |
| 2010/0212199 A1* | 8/2010 | Edmonds | G09F 21/04 40/581 |
| 2011/0219649 A1* | 9/2011 | Spann | G09F 9/33 40/550 |
| 2012/0014104 A1 | 1/2012 | Morris et al. | |
| 2012/0161669 A1* | 6/2012 | Lorentz | G09F 17/00 315/312 |
| 2012/0281391 A1 | 11/2012 | Bort | |
| 2015/0280362 A1* | 10/2015 | Huang | H01R 13/6272 439/354 |

* cited by examiner

ILLUMINATED SUPPORT MOUNT FOR VEHICLE FLAG

PRIORITY

The present application claims priority benefit under 35 USC § 119(e) to U.S. provisional patent application Ser. No. 62/043,546 filed Aug. 29, 2014, the contents of which are incorporated herein by reference in its entirety.

FIELD

The present disclosure is generally related to vehicle flags and, more particularly, to an illuminated support mount for vehicle flags.

BACKGROUND

Vehicle flags, commonly referred to as car flags, are a great way to show spirit, pride and support for various organizations. A car flag typically includes a flag supported on a mast that is removably connected to a vertically movable side window of a motor vehicle. A window mount having an inverted U-shaped clip seats over the top edge of the window and the mast is connected to the window mount.

Car flags are most commonly seen while travelling to an athletic event and at tailgates, such as those regularly attended at college and professional football games. However, recently, car flags have been employed in conjunction with motor vehicles for promoting sales and or rentals, as for example, in car lots, for distinguishing one's car from others in parking lots, and for indicating patriotism, national origin, etc. as usually displayed on slow moving vehicles in motorcades and parades.

While such car flags are easily recognizable during the day, they are relatively ineffective after dark or in low light conditions. As such, the usable time of the car flag is limited to daylight hours. Furthermore, significant bending and torsional moments may be generated by external wind forces exerted on the mast and the flag when the vehicle travels at normal travelling speeds. In order to withstand the rigors of normal travel speeds, the mast is constructed from a solid material having sufficient flexibility to withstand such wind forces and the mast is rigidly connected to the window mount.

Accordingly, those skilled in the art continue with development efforts in the field of vehicle flags.

SUMMARY

The following is a non-exclusive list of example embodiments of the subject matter according the present disclosure, which may or may not be claimed.

In one embodiment, the disclosed illuminated support mount for a vehicle flag may include a base, a power input jack disposed outwardly of the base, a mast connected to the base, and a light source disposed within the mast and electrically connected to the power input jack.

In another embodiment, the disclosed illuminated support mount for a vehicle flag may include a base, a clip extending from the base, a power input jack disposed at an end of the clip, a channel extending from the power input jack, through the clip, and into the base, a mast connected to the base, and a light source disposed within the mast, the light source being electrically connected to the input power jack via an electrical connection extending through the channel, wherein the clip is configured to be connected to a window of a vehicle such that the power input jack is positioned within an interior of the vehicle.

Other embodiments of the disclosed illuminated support mount will become apparent from the following detailed description, the accompanying drawings and the appended claims.

BRIEF DESCRIPTION OF THE DRAWINGS

Figure 1:
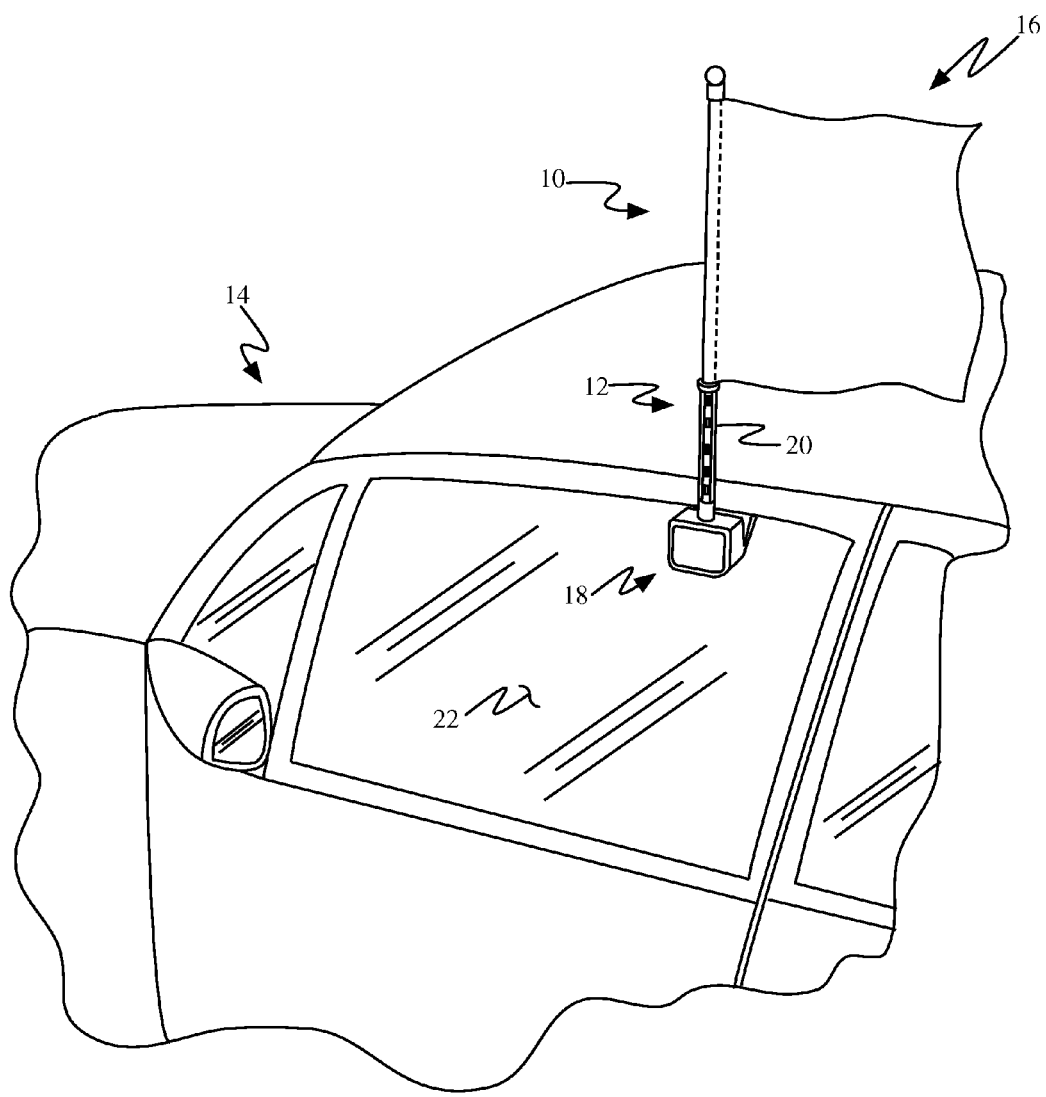
Figure 2:
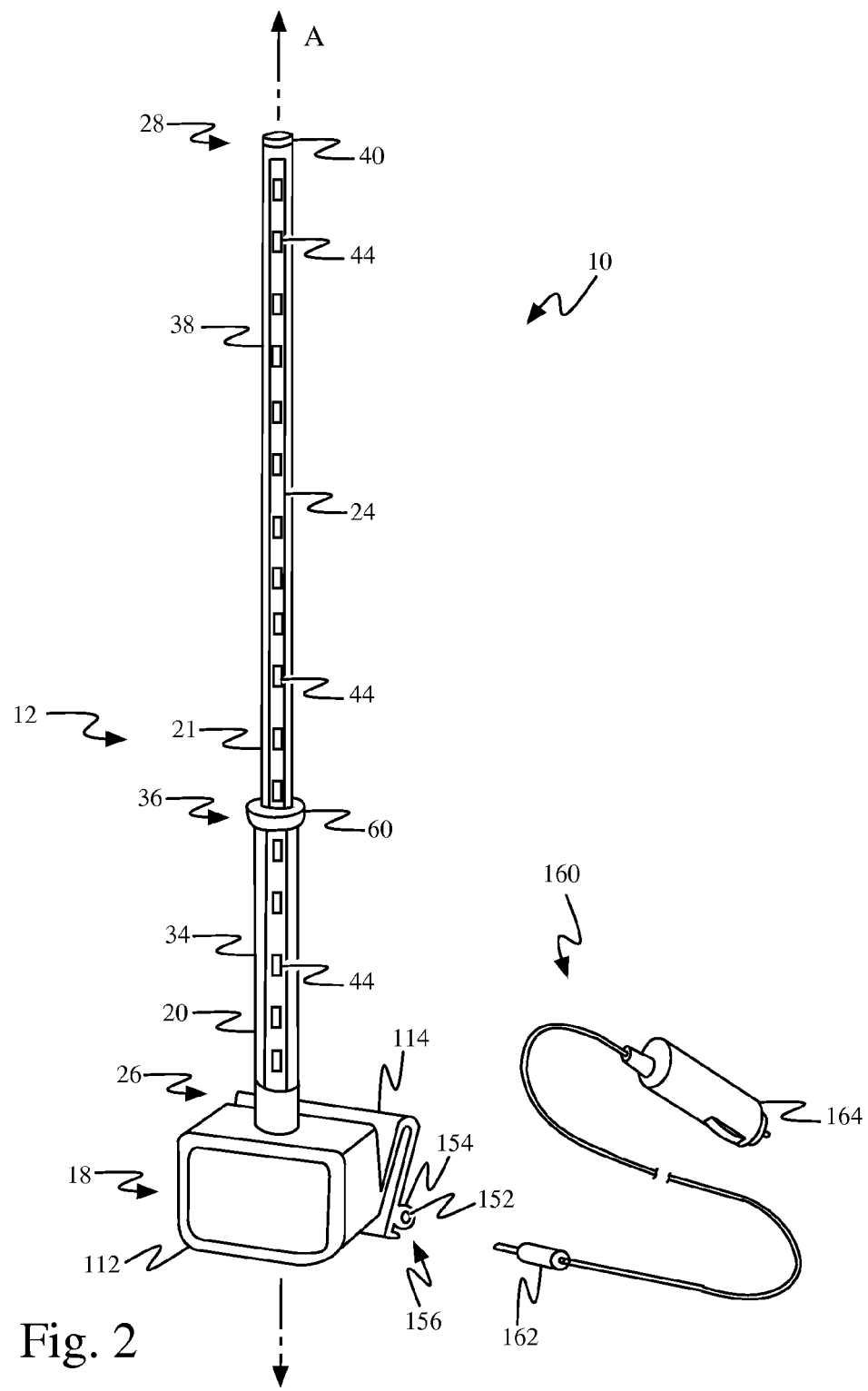
Figure 3:
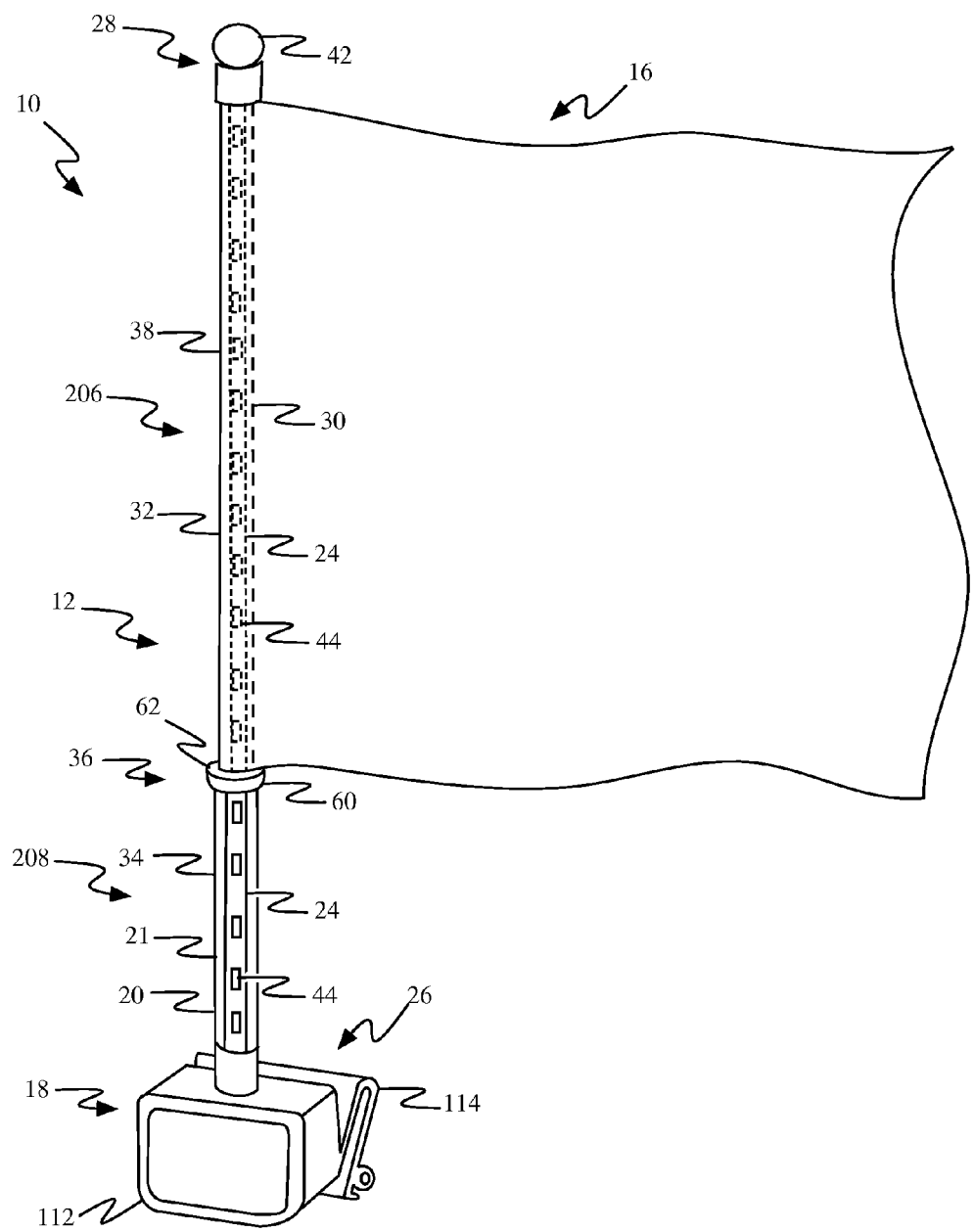
Figure 4:
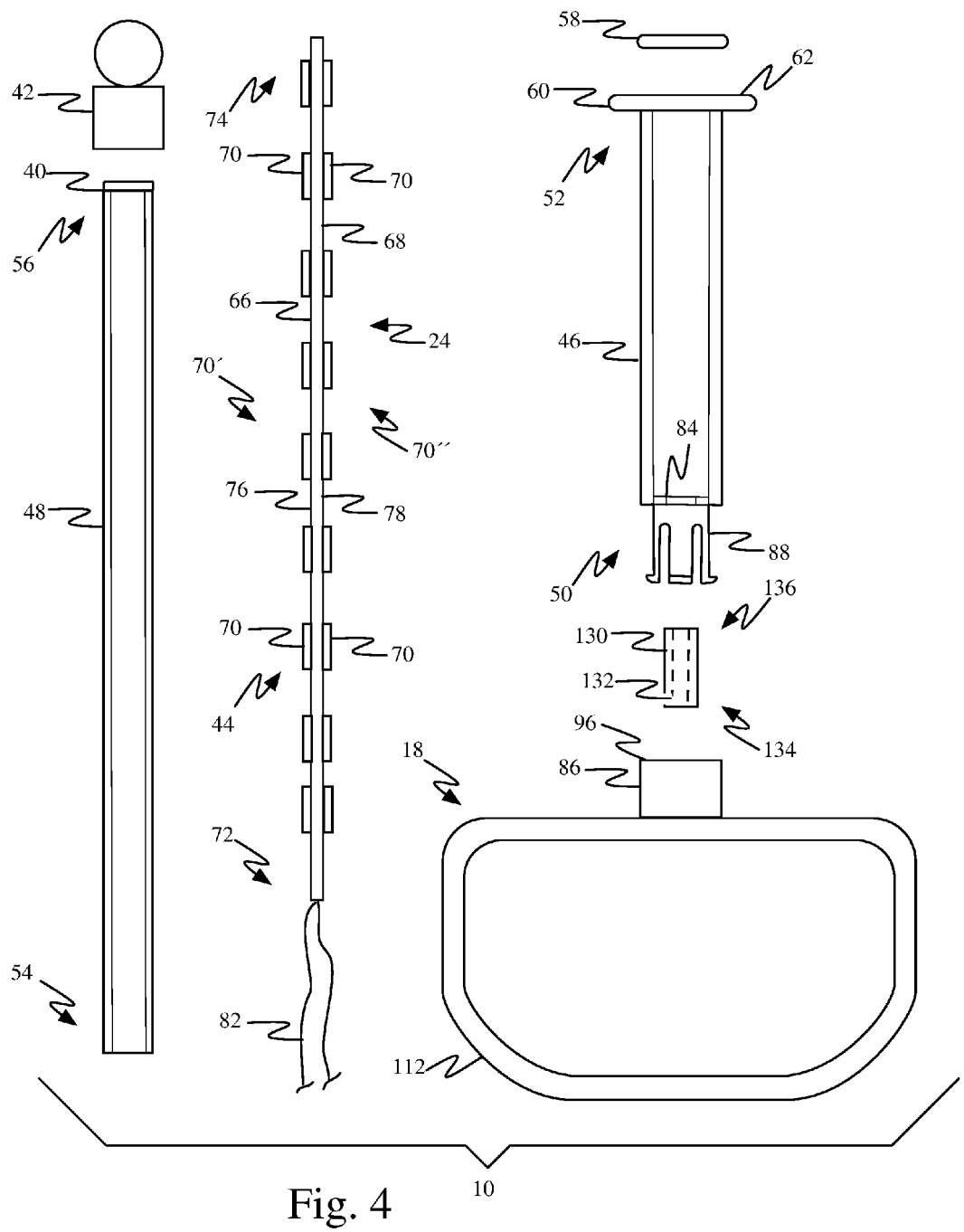
Figure 5:
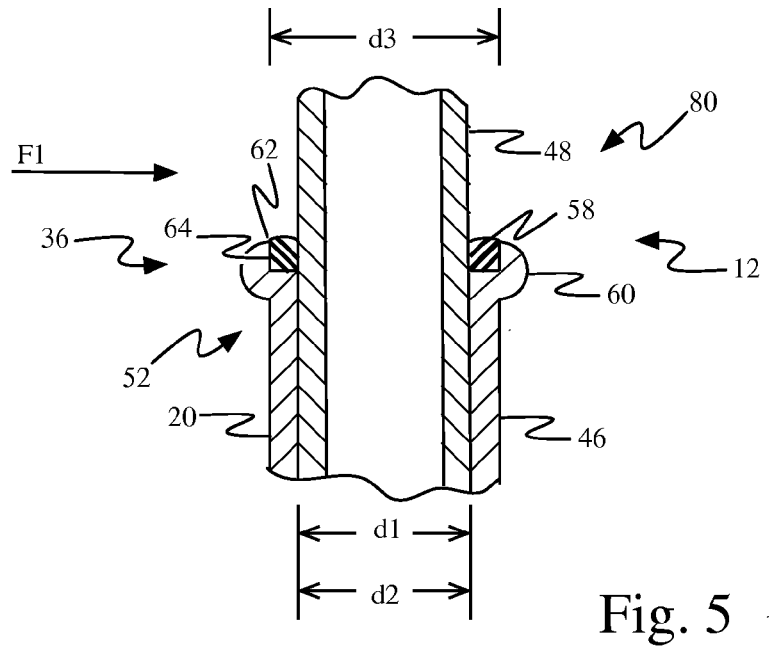
Figure 6:
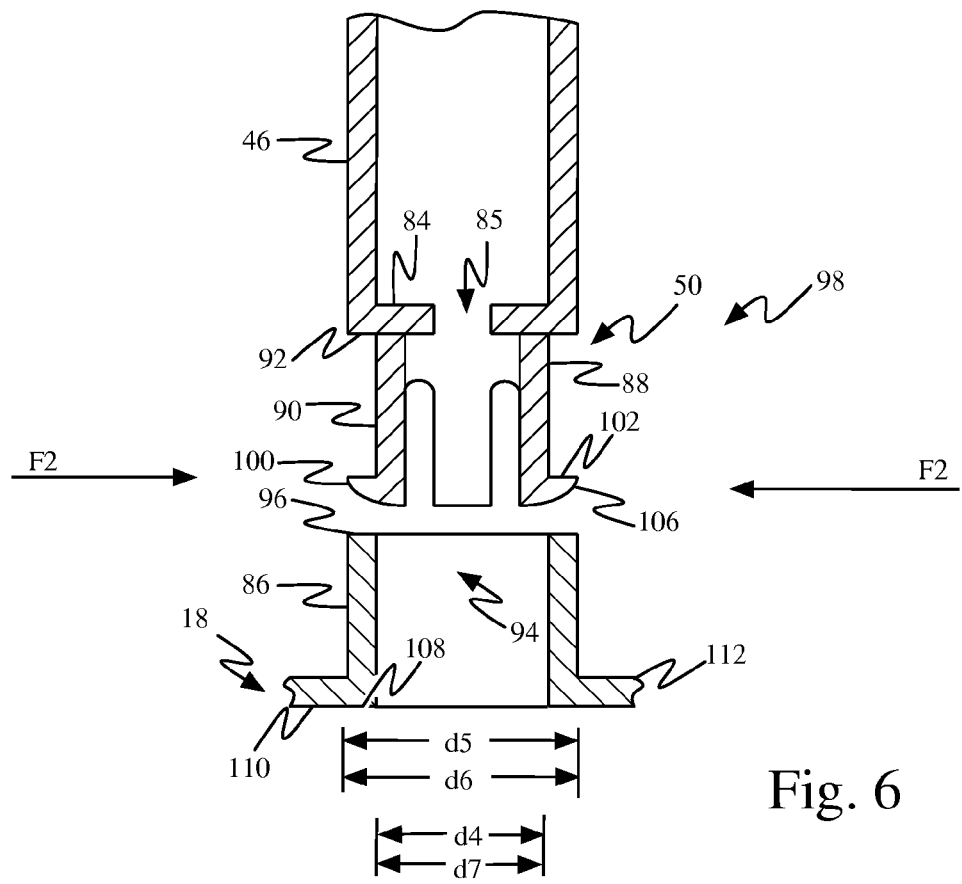
Figure 7:
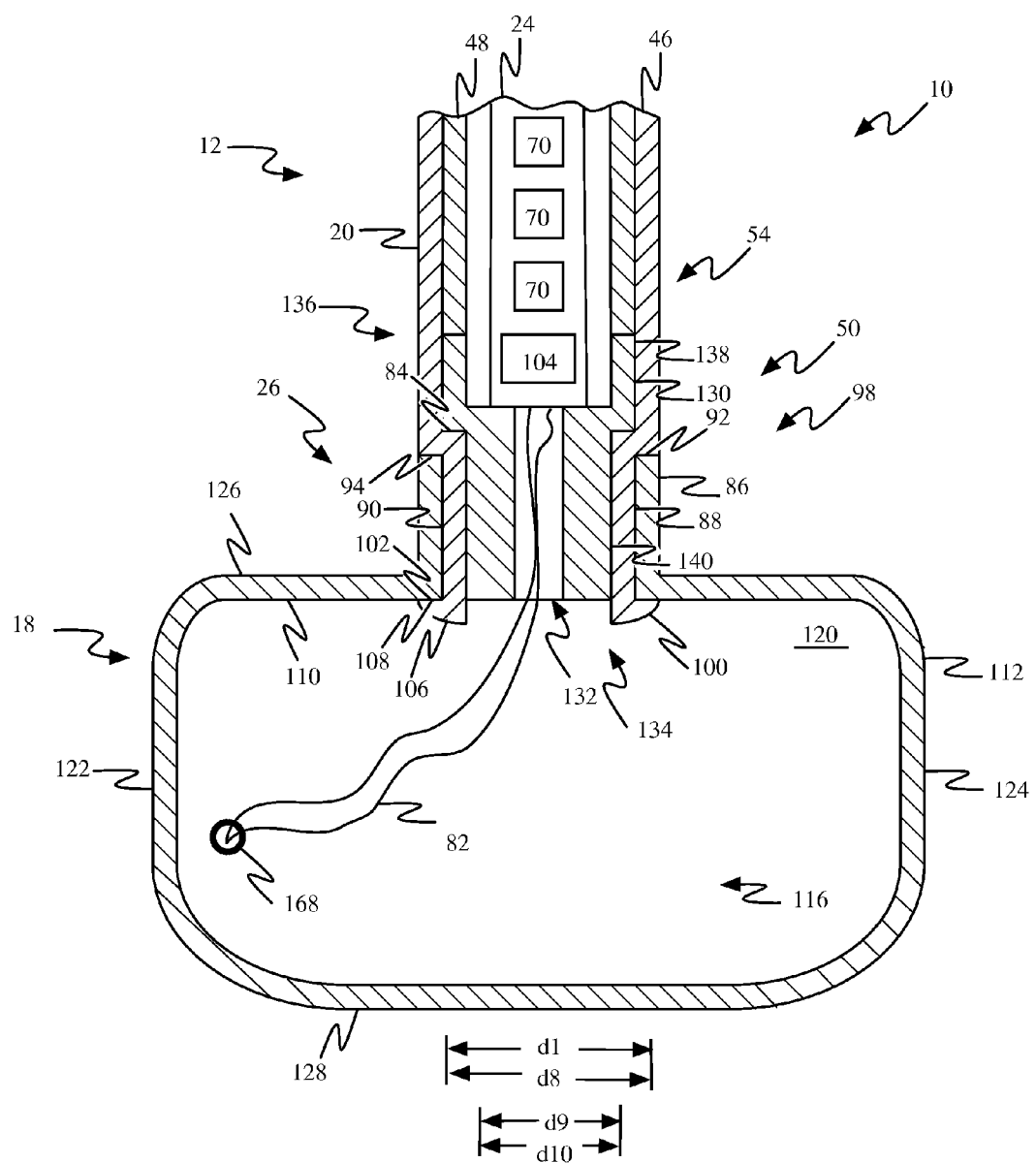
Figure 8:
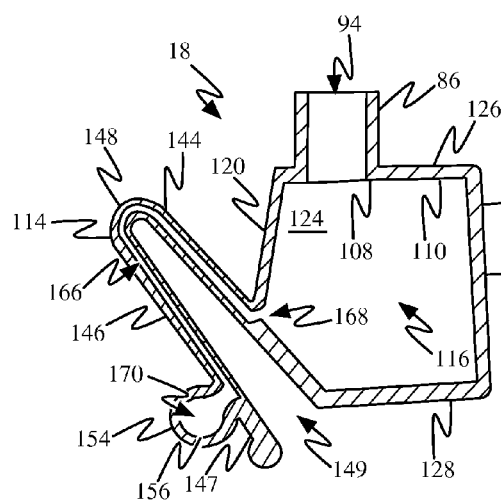
Figure 9:
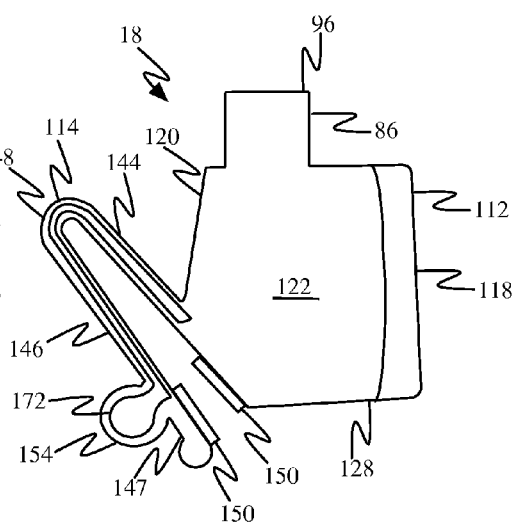
Figure 10:
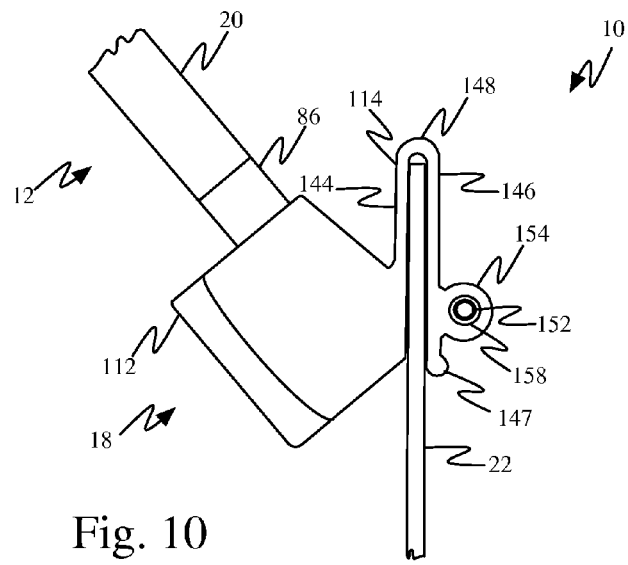
Figure 11:
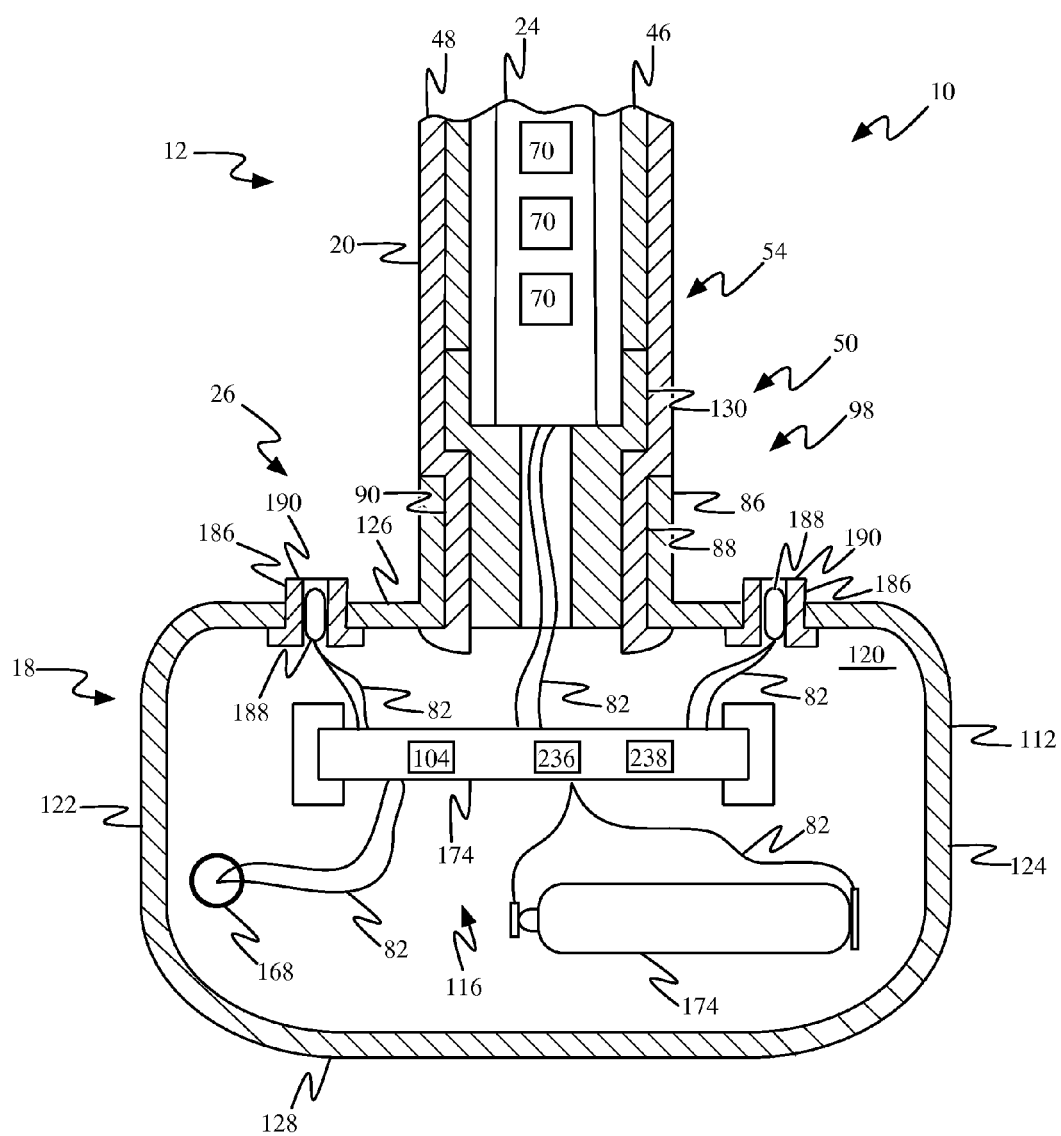
Figure 12:
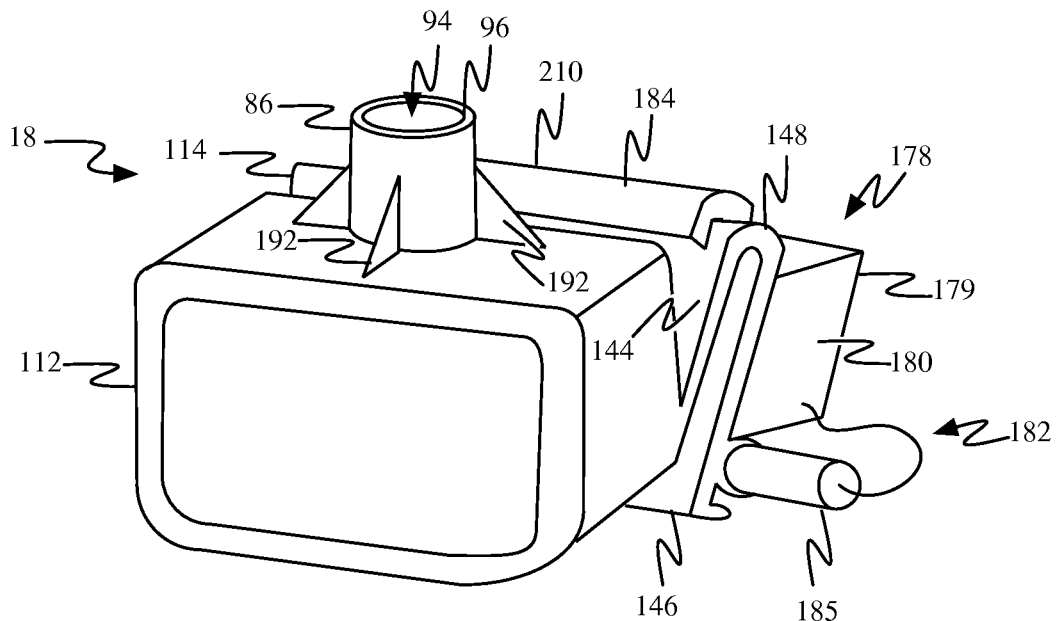
Figure 14:
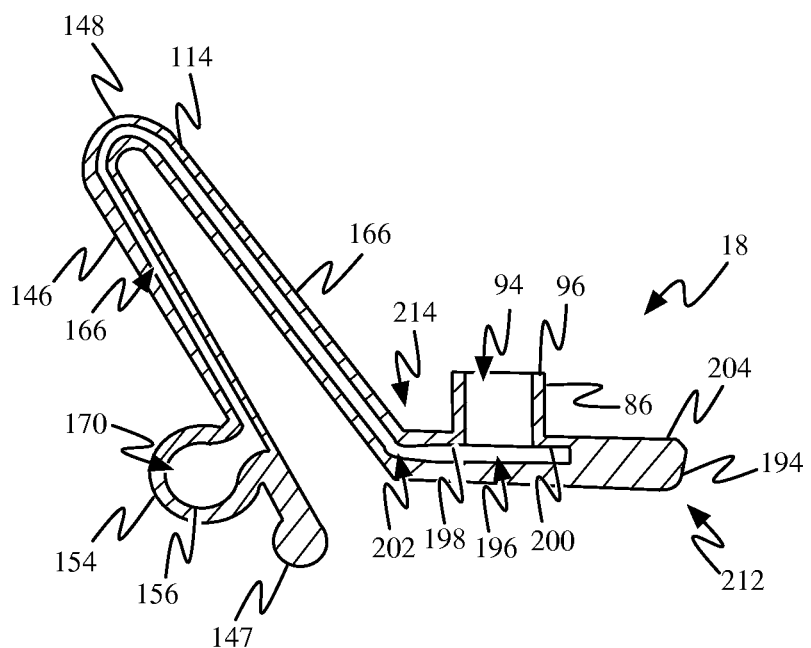
Figure 13:
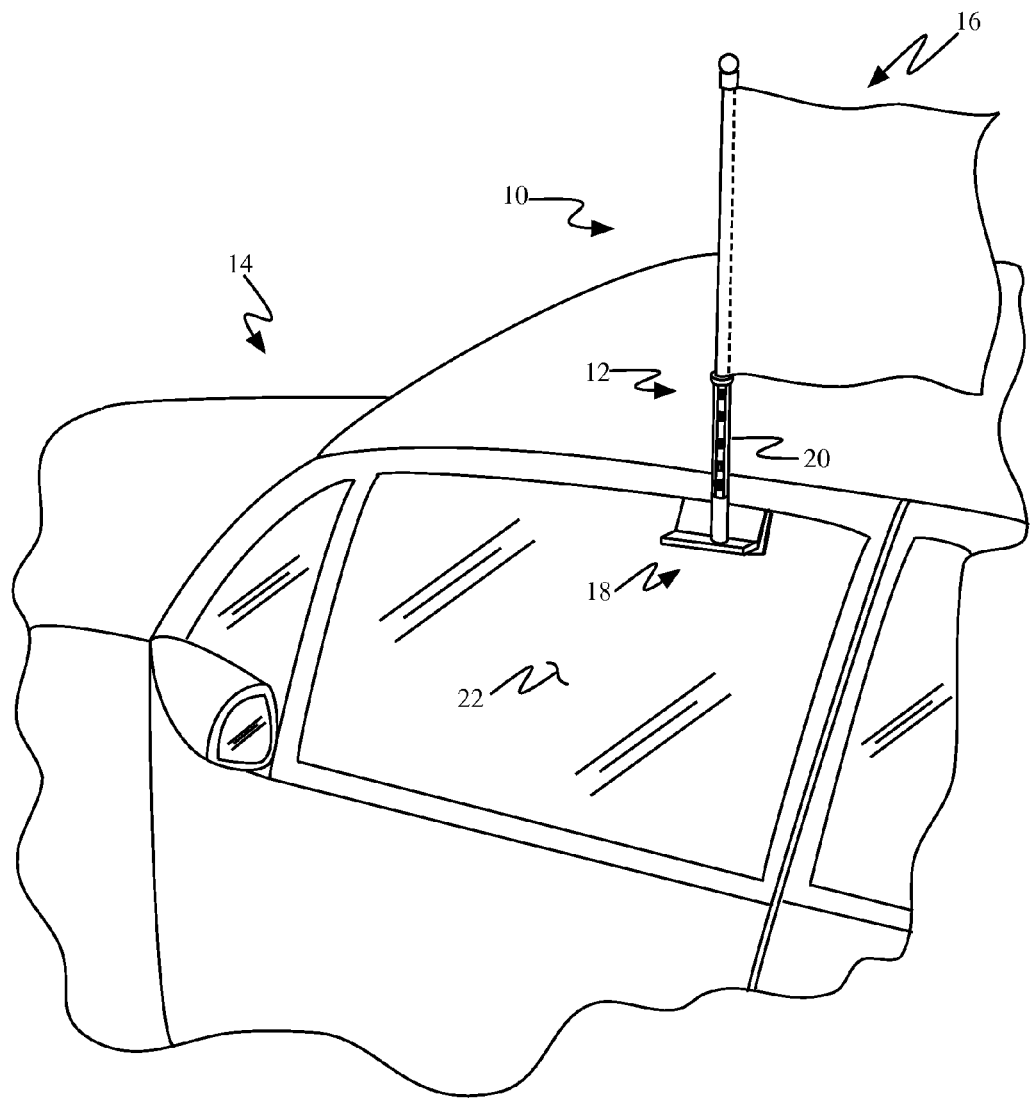
Figure 15:
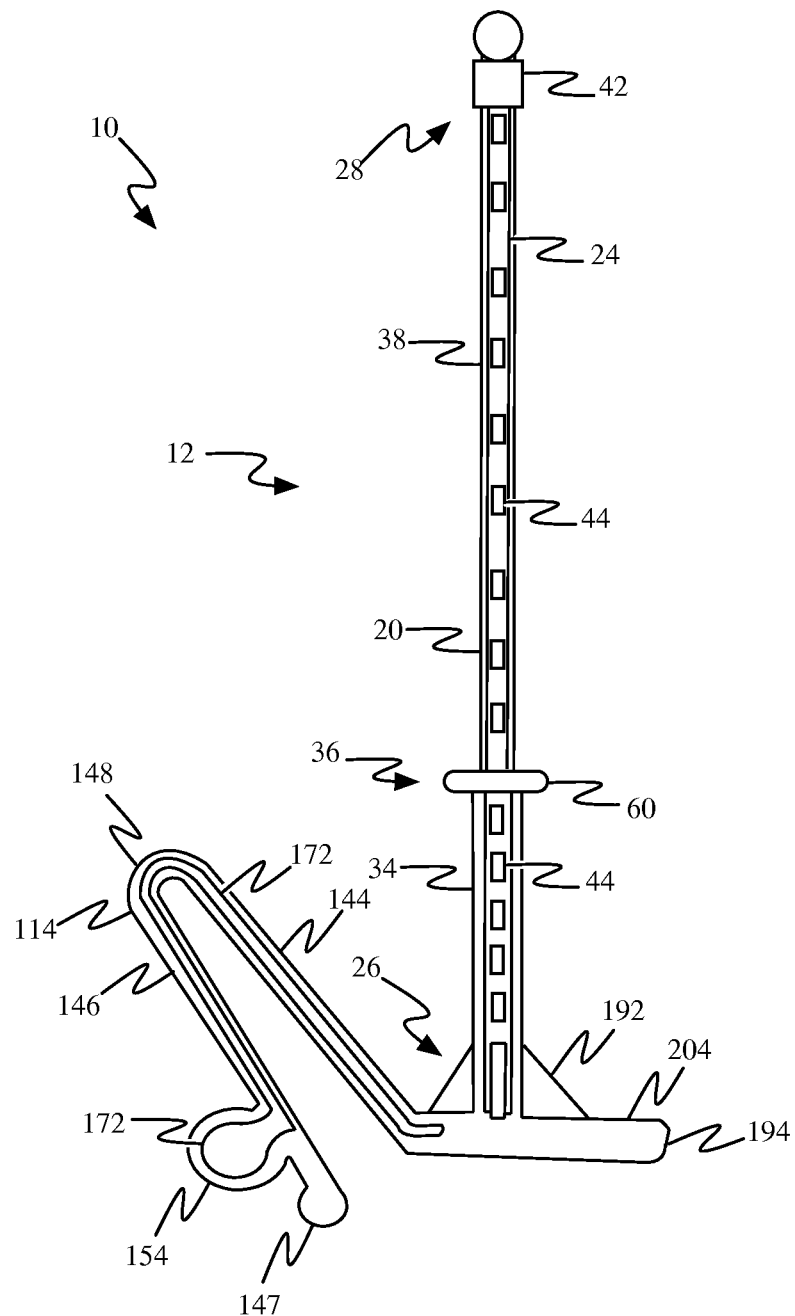
Figure 16:
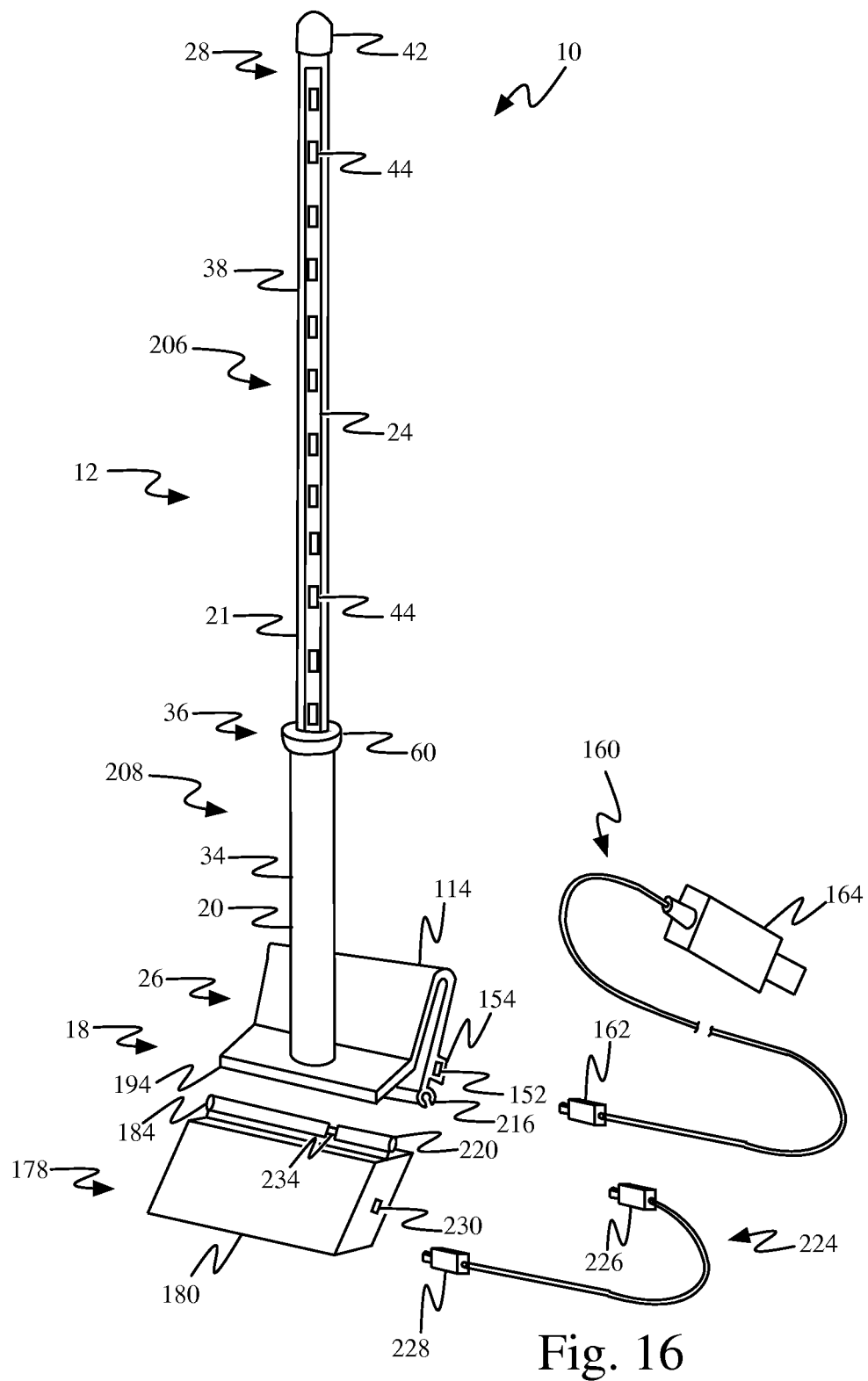
Figure 17:
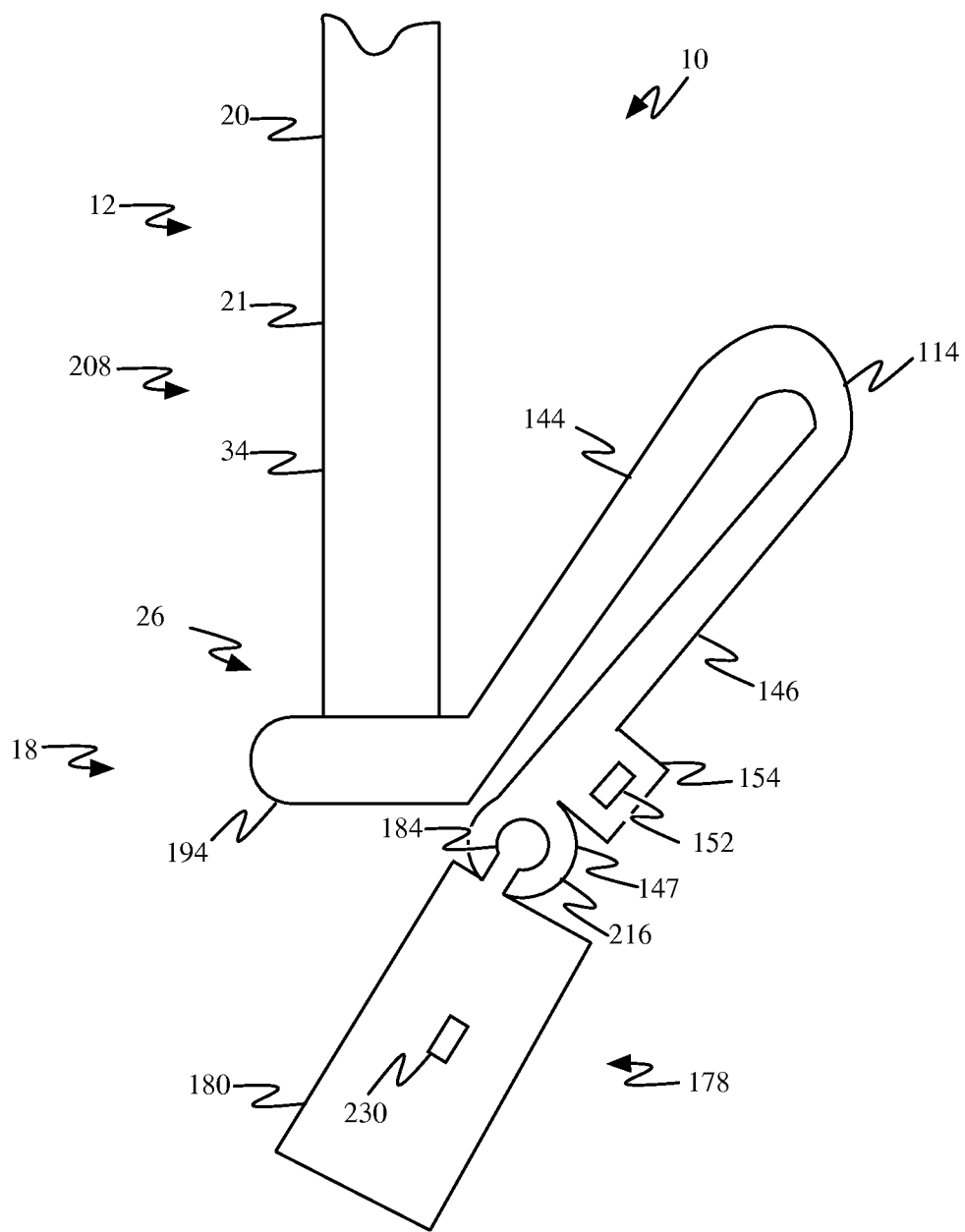
Figure 18:
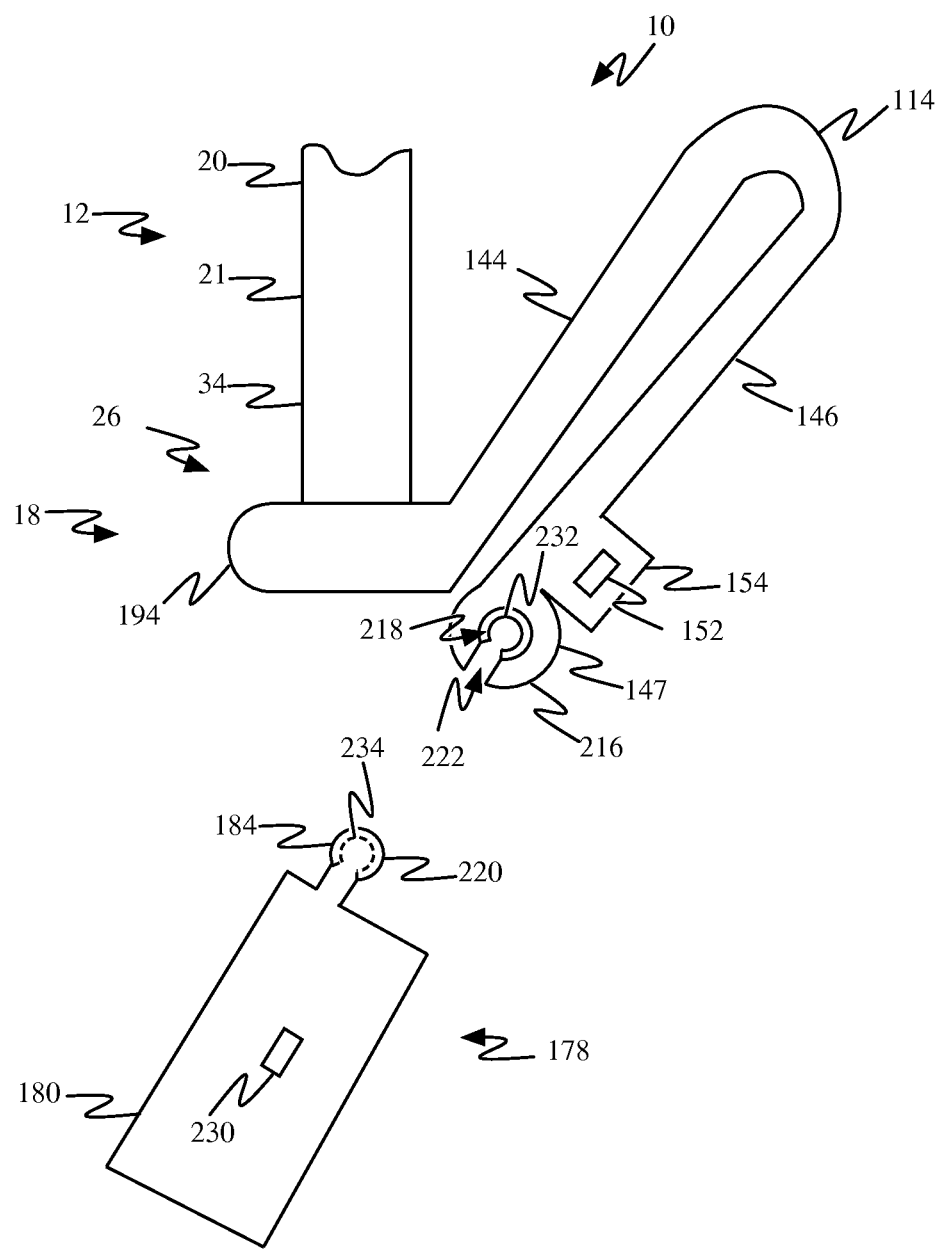
Figure 19:
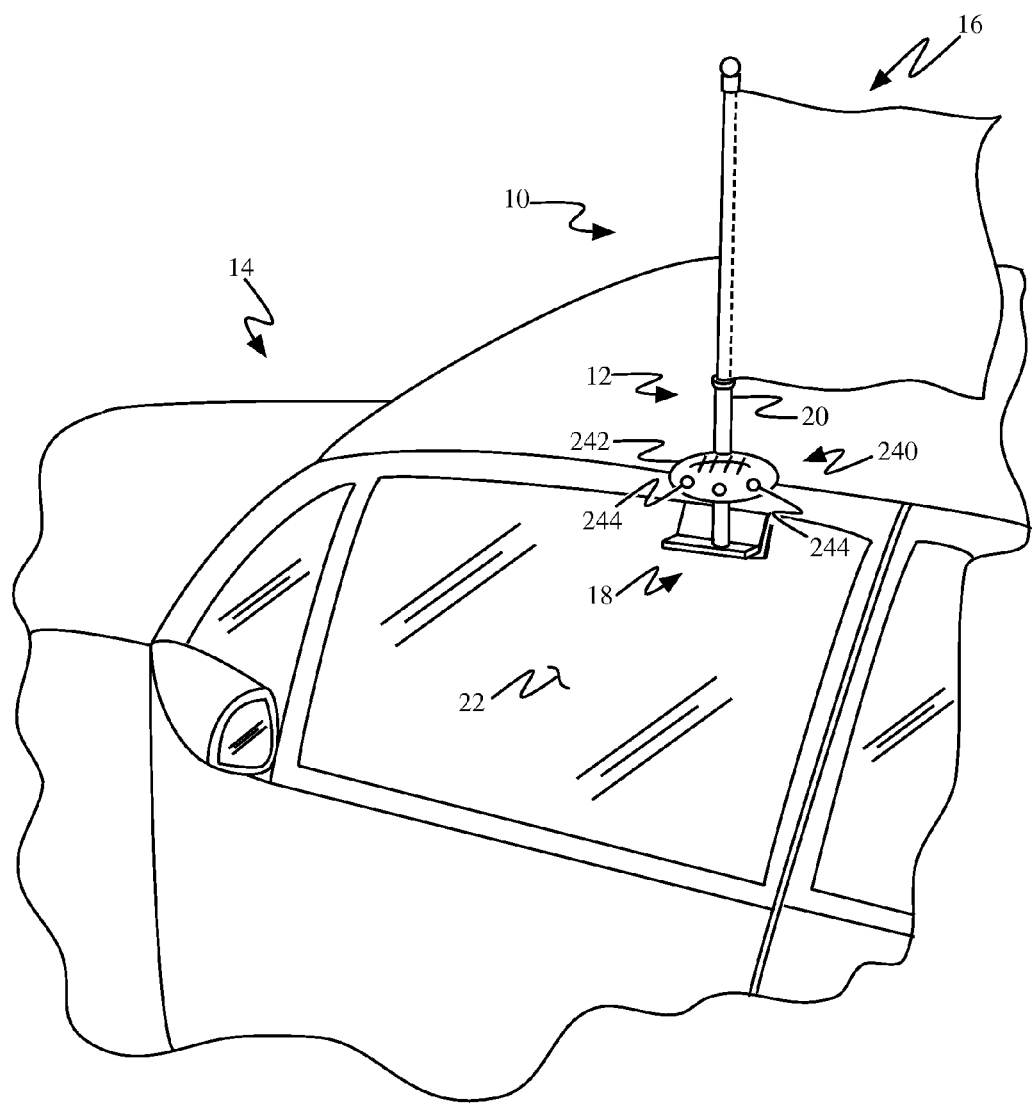

Having thus described example embodiments of the present disclosure in general terms, reference will now be made to the accompanying drawings, which are not necessarily drawn to scale, and wherein like reference characters designate the same or similar parts throughout the several views, and wherein:

FIG. 1 is a schematic perspective view of one embodiment of the disclosed illuminated support mount for vehicle flags, shown connected to a vehicle;

FIG. 2 is a schematic perspective view of one embodiment of the disclosed illuminated support mount for vehicle flags represented in FIG. 1;

FIG. 3 is a schematic perspective view of the disclosed illuminated support mount for vehicle flags represented in FIG. 2, shown with a connected flag;

FIG. 4 is a schematic exploded elevational view of one embodiment of the disclosed illuminated support mount for vehicle flags represented in FIG. 1;

FIG. 5 is a schematic elevational view, in section, of one embodiment of the first mast interface of the disclosed illuminated support mount for vehicle flags represented in FIG. 4;

FIG. 6 is a schematic elevational view, in section, of one embodiment of the second mast interface of the disclosed illuminated support mount for vehicle flags represented in FIG. 4;

FIG. 7 is a schematic front elevational view, in section, of one embodiment of the second mast interface and the base of the disclosed illuminated support mount for vehicle flags represented in FIG. 4;

FIG. 8 is a schematic left side elevational view, in section, of one embodiment of the base of the disclosed illuminated support mount for vehicle flags represented in FIG. 4;

FIG. 9 is a schematic left side elevational view of one embodiment of the base of the disclosed illuminated support mount for vehicle flags represented in FIG. 4;

FIG. 10 is a schematic right side elevational view of one embodiment of the disclosed illuminated support mount for vehicle flags represented in FIG. 4, shown connected to a window of the vehicle;

FIG. 11 is a schematic front elevational view, in section, of one embodiment of the second mast interface and the base of the disclosed illuminated support mount for vehicle flags represented in FIG. 4;

FIG. 12 is a schematic perspective view of one embodiment of the base of the disclosed illuminated support mount for vehicle flags represented in FIG. 4 and one embodiment of the external stored power supply of the disclosed illuminated support mount for vehicle flags;

FIG. 13 is a schematic perspective view of one embodiment of the disclosed illuminated support mount for vehicle flags, shown connected to the vehicle;

FIG. 14 is a schematic left side elevational view, in section, of one embodiment of the base of the disclosed illuminated support mount for vehicle flags represented in FIG. 13; and FIG. 15 is a schematic left side elevational view of one embodiment of the disclosed illuminated support mount for vehicle flags represented in FIG. 13;

FIG. 16 is a schematic perspective view of one embodiment of the disclosed illuminated support mount for vehicle flags represented in FIG. 13 and one embodiment of the external stored power supply of the disclosed illuminated support mount for vehicle flags;

FIG. 17 is a schematic left side elevational view of one embodiment of the disclosed illuminated support mount for vehicle flags and external stored power supply represented in FIG. 16;

FIG. 18 is a schematic exploded left side elevational view of the illuminated support mount for vehicle flags and external stored power supply represented in FIG. 17; and FIG. 19 is a schematic perspective view of one embodiment of the disclosed illuminated support mount for vehicle flags, shown connected to the vehicle.

DETAILED DESCRIPTION

The following detailed description refers to the accompanying drawings, which illustrate specific example embodiments of the disclosure. Other embodiments having different structures and operations do not depart from the scope of the present disclosure. Like reference numerals may refer to the same element or component in the different drawings.

As used herein, "coupled", "connected", and/or "attached" may mean associated directly as well as indirectly. For example, a member A may be directly associated (e.g., coupled, connected, and/or attached) with a member B, or may be indirectly associated (e.g., coupled, connected, and/or attached) therewith, for example, via another member C. Those skilled in the art will appreciate that not all relationships between the various disclosed elements are necessarily represented.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" and/or "one example embodiment" may mean that one or more feature, structure, and/or characteristic described in connection with the example and/or example embodiment is included in at least one implementation. The phrase "one example" or "one example embodiment" in various places in the following description may or may not be referring to the same example and/or example embodiment.

Illustrative, non-exhaustive example embodiments of the subject matter according the present disclosure, which may or may not be claimed, are provided below.

Referring to FIG. 1, one example embodiment of the disclosed illuminated support mount, generally designated 10, for vehicle flags may be include a flag support 12 configured to be connected to a motor vehicle 14 and support and display a vehicle flag 16. The flag support 12 may be illuminated, for example at night, such that visual attention may be directed toward the vehicle 14, the flag support 12 and/or the flag 16.

Referring to FIGS. 2 and 3, in one example embodiment, the disclosed illuminated support mount 10 may include a base 18 and the flag support 12 connected to the base 18. The base 18 may be mounted or otherwise connected to the motor vehicle 14 (FIG. 1). As one example, the base 18 may be connected to a vertically adjustable side window 22 (FIG. 1) of the motor vehicle 14. A light source 24 may be disposed within the flag support 12. The light source 24 may be configured to illuminate an area proximate (e.g., at or near) and/or around the flag support 12 (e.g., circumferentially), the flag 16 (FIG. 3) and/or the window 22 of the vehicle 14.

While the disclosed illuminated support mount 10 is described and shown herein as being connected to an automobile, those skilled in the art will recognize that the base 18 may be configured for connection to any type of vehicle 14 including, but not limited to, motorcycles, boats, bicycles, recreational vehicles, all terrain vehicles, golf carts, and the like.

In one example embodiment, the flag support 12 may include a mast 20. The mast 20 may include a longitudinal axis A (FIG. 2) and may be configured to support the flag 16 (FIG. 3). The mast 20 may include a first (e.g., lower) end 26 and a longitudinally opposed second (e.g., upper) end 28. The mast 20 may be connected to the base 18 at the first end 26. As one example, the mast 20 may be an elongated support pole or post 21 having a substantially circular cross-sectional shape. In one example embodiment, the mast 20 may include (e.g., be formed as) a single unitary post 21. In one example embodiment, as shown in FIG. 4 and will be described in more detail herein below, the mast 20 may be made as a plurality of interconnected posts 21 (e.g., a first post 46 and a second post 48).

Referring to FIG. 3, in one example embodiment, the flag 16 may be connected to the mast 20 proximate (e.g., at or near) the second end 28. For example, the flag 16 may include a mast-receiving sleeve 30 disposed along at least a portion of a lateral edge 32. The sleeve 30 may be configured to receive at least a portion (e.g., an upper portion 206) of the mast 20.

Referring to FIGS. 2 and 3, in one example embodiment, the mast 20 may be a hollow tube configured to receive the light source 24 therein. Those skilled in the art will recognize that the dimensions (e.g., length, interior diameter, and/or exterior diameter) of the mast 20 may depend on various factors including, but not limited to, the size (e.g., length, width, and/or thickness) of the light source 24, the size (e.g., lateral width) of the flag 16, and/or the diameter of the sleeve 30 of the flag 16.

In one example embodiment, the mast 20 may include a collar 60. The collar 60 may be configured to retain the flag 16 at an appropriate position upon the mast 20 (FIG. 3). As one example, the collar 60 may be positioned proximate an intermediate location 36 of the mast 20 (e.g., defining the upper portion and a lower portion 208 of the mast 20) such that the flag 16 is positioned on the upper portion 206 of the mast 20 (e.g., extending from proximate the intermediate location 36 to proximate the second end 28).

In one example embodiment, the collar 60 may be connected to and extend radially outward from an exterior surface of the mast 20 for defining a support surface 62. As one example, the collar 60 may be integral to the mast 20

(e.g., formed as a unitary body during fabrication of the mast 20). As one example, the collar 60 may be connected (e.g., by adhesives, ultrasonic welding, or the like) circumferentially around the mast 20 proximate the intermediate location 36 of the mast 20.

In one example embodiment, the collar 60 may include a substantially round cross-section and the support surface 62 may be substantially perpendicular to the mast 20. The support surface 62 may extend a suitable distance from the mast 20 to support a lower edge of the sleeve 30 of the flag 16 (FIG. 3).

In one example embodiment, the second end 28 of the mast 20 may be closed or otherwise sealed to act as a barrier such that the light source 24 may not escape from within the mast 20 and to protect the light source 24 from moisture, dirt, dust and/or weather. As one example, a cover 40 (FIG. 2) may be connected (e.g., by adhesive, ultrasonic welding, or the like) to the second end 28 of the hollow tubular mast 20 (e.g., the second section 38 of the mast 20). As one example, the mast 20 (e.g., the second section 38) may be fabricated such that the second end 28 is closed.

In one example embodiment, a cap 42 (FIG. 3) may be removably connected to the second end 28 of the mast 20 (e.g., the second section 38). The cap 42 may retain the flag 16 on the mast 20 (e.g., by preventing the flag 16 from sliding off of the mast 20). The cap 42 may be connected to the second end 28 of the mast 20 following at least a portion of the mast 20 (e.g., the upper portion 206) being fully received by the sleeve 30 of the flag 16. In one example, the cap 42 may be tubular end cap having a decorative tip. A plurality of decorative caps 42 may be interchangeably connected to the mast 20.

In one example, the cap 42 may be configured to receive the second end 28 of the mast 20 (e.g., the second section 38) and completely cover the second end 28 to also serve as a decorative finishing structure to the flag support 12. In one example, the cap 42 may be secured by a friction fit to the second end 28 of the mast 20. In one example, the cap 42 may be threadingly connected (e.g., a screw-on cap) to the second end 28 of the mast 20.

In one example, the cap 42 may be a semi-circular clip (e.g., a C-shaped clip) (not shown) connected to the mast 20 (e.g., the second section 38) proximate the second end 28. The cap 42 may enable the flag 16 to be installed and/or removed from the mast 20 (e.g., the post 21) without stretching or otherwise damaging the flag 16.

In one example embodiment, the light source 24 may be configured to be located within the hollow interior of the mast 20. As one example, the light source 24 may be inserted through an open second end 28 of the mast 20 prior to the second end 28 being closed. As one example, the light source 24 may be inserted through an open first end 26 of the mast 20.

In one example embodiment, the light source 24 may include at least one illuminator 44. The illuminator 44 may be any suitable source of illumination including, but not limited to, a light emitting diode ("LED"), an incandescent filament, a rope light, a fluorescent light, a neon gas bulb, a filament lamp, a spring lamp, a tube lamp, a fiber optic light, and the like. In one example, substantially an entire length of the mast 20 may be illuminated by the light source 24. As one example, the light source 24 may extend from proximate the first end 26 to proximate the second end 28 of the mast 20. In one example, at least a portion of the mast 20 (e.g., the lower portion 208, the upper portion 206, and/or a middle portion) may be illuminated by the light source 24.

In one example embodiment, the mast 20 may be manufactured from a rigid or semi-rigid material suitable to withstand environmental conditions associated with outdoor use on a stationary and/or moving motor vehicle 14 (FIG. 1). As one example, the mast 20 may have sufficient flexibility to slightly bend in response to an external force, such as wind (e.g. force F1 shown in FIG. 5), and sufficient rigidity to remain erect in response to the external force. The mast 30 may be manufactured from a generally transparent material such that light from the light source 24 may pass therethrough to illuminate the area around the mast 20 and/or the flag 16.

In one general, non-limiting example embodiment, the mast 20 may be manufactured from a substantially clear thermoplastic (e.g., acrylic) or other material having light transmitting properties (e.g., substantially transparent materials). As one example, an entire length of the mast 20 (e.g., from proximate the first end 26 to proximate the second end 28) may be substantially transparent. As one example, only a portion (e.g., the lower portion 208 or the upper portion 206) of the length of the mast 20 may be substantially transparent.

In one example embodiment, the mast 20 may include non-uniform light transmitting properties. Such non-uniform properties may be inherent to the material from which the mast 20 is constructed or may be imparted to mast 20 by at least partially covering it, painting it, or otherwise modifying or decorating it. As one example, a first (e.g., lower) section 34 of the mast 20 (e.g., from proximate the first end 26 to proximate the intermediate location 36) may be translucent and the second (e.g., upper) section 38 (e.g., from proximate the intermediate location 36 to proximate the second end 28) may be transparent. As one example, the first section 34 of the mast 20 may be opaque and the second section 38 may be transparent. As one example, at least the upper portion 206 of the mast 20 adjacent to the flag 16 may be transparent.

In one example embodiment, the mast 20 may be colored. As one example, the mast 20 may include a single uniform color, multiple colors, or colored designs. Such coloring may be inherent to the material from which the mast 20 is constructed or may be imparted to mast 20 by at least partially covering it, such as with a transparent or translucent colored sleeve (not shown), painting it, or otherwise modifying or decorating it.

Those skilled in the art will appreciate that the mast 20 may include any combination of varying sections, degrees of transparency and/or translucency, colors, design features, and the like.

Referring to FIG. 4, in one example embodiment, the mast 20 may include a first post 46 and a second post 48. The first post 46 may include a first (e.g., lower) end 50 and a longitudinally opposed second (e.g., upper) end 52. The second post 48 may include a first (e.g., lower) end 54 and a longitudinally opposed second (e.g., upper) end 56. The first post 46 may be configured to receive at least a portion of the second post 48 proximate the first end 54 (e.g., a lower portion of the second post 48).

In one example embodiment, the first post 46 may be a hollow tube and the second post 48 may be a hollow tube. An inner diameter d1 (FIG. 5) of the first post 46 may be sized in close tolerance to an outer diameter d2 (FIG. 5) of the second post 48 such that an inserted portion (e.g., the lower portion) of the second post 48 fits snuggly within the first post 46.

In one example, upon connection of the first post 46 and the second post 48 (e.g., by inserting the lower portion of the second post 48 within the first post 46), the second end 56 of the second post may define the second end 28 of the mast 20, the first end 50 of the first post 46 may define the first end 26 of the mast 20, and the second end 52 of the first post 46 may define the intermediate location 36 of the mast 20 (FIG. 2). As one example, the first post 46 may define the first (e.g., lower) section 34 of the mast 20 (e.g., the lower portion 208) and the exposed portion (e.g., upper portion) of the second post 48 extending from the second end 52 of the first post 46 may define the second (e.g., upper) section 38 of the mast 20 (e.g., the upper portion 206).

In one example embodiment, the mast 20 may include a gasket 58 positioned between the interior surface of the first post 46 and the exterior surface of the second post 48 to seal an interface between the second post 48 and the first post 46. As one example, the gasket 58 may be an elastomeric O-ring having a substantially round cross-section positioned proximate the second end 52 of the first post 46. The gasket 58 may also serve to reduce vibrations and stresses applied to the second post 48 at a first mast interface 80 (FIG. 5) between the second post 48 and the first post 48, such as in response to the external force F1 (e.g., a load applied to the second post 48 by wind and/or the flag 16 as the vehicle 14 is moving).

Referring to FIG. 5, in one example embodiment, the collar 60 may be positioned at the second end 52 of the first post 46. The collar 60 may have an inner diameter d3 (e.g., defining the inner diameter of the second end 52 of the first post 46) slightly larger that the inner diameter d1 of the first post 46 and the outer diameter d2 of the second post 48 thus, defining a space 64 between the collar 60 and the second post 48. The gasket 58 may be positioned between the collar 60 and the second post 48 to fill the space 64 and seal the interface 80 between the second post 48 and the first post 46. As one example, a friction fit may secure the gasket 58 within the space 64. As one example, an adhesive may affix the gasket 58 within the space 64, for example, to the first post 46 and/or the second post 48.

Referring again to FIG. 4, in one example embodiment, the light source 24 may include a light emitting diode ("LED") strip 66. The LED strip 66 may include a first (e.g., lower) end 72 and a longitudinally opposed second (e.g., upper) end 74. The LED strip 66 may include an elongated, substantially rigid printed circuit board ("PCB") 68 and at least one light emitting diode ("LED") 70 electrically connected to the PCB 68.

In one example embodiment, the LEDs 70 (e.g., each LED 70) may include an outer shell in which an active substance such as a phosphor compound, gallium nitride, or gallium arsenide is contained. When an electrical current is supplied to the LEDs 70, the active substance is excited causing the emission of visible light. The color of the LED 70 may be determined by the color of the outer shell or the type of active substance located in the LED 70. The LEDs 70 may transmit any visible type of light (e.g., white light, red light, green light or blue light).

In one example construction, the PCB 68 may include a first major surface 76 and an opposed second major surface 78. The LEDs 70 (e.g., a plurality of LEDs 70) may be electrically connected to at least one of the first major surface 76 and the second major surface 78. In one example, the LED 70 may be a surface-mount device ("SMD") electrically connected directly to the major surface of the PCB 68 through known surface-mount technology ("SMT").

In one example embodiment, a first plurality of LEDs 70' may be mounted to the first major surface 76 in order to illuminate the mast 20 in a an illumining range of approximately 180°. As one example, the first plurality of LEDs 70' may extend substantially an entire length of the PCB 68 from proximate the first end 72 to proximate the second end 74 of the LED strip 66. As one example, the first plurality of LEDs 70' may extend only a portion of the length of the PCB 68.

In one example embodiment, a second plurality of LEDs 70" may be mounted to the second major surface 78 opposite the first plurality of LEDs 70' in order to illuminate the mast 20 in an illuminating range of approximately 360°. As one example, the second plurality of LEDs 70" may extend substantially the entire length of the PCB 68 from proximate the first end 72 to proximate the second end 74 of the LED strip 66. As one example, the second plurality of LEDs 70" may extend only a portion of the length of the PCB 68.

In one example embodiment, each LED 70 of the first 70' and second 70" plurality of LEDs may be spaced apart from an adjacent LED 70. In one example, each LED 70 of the first plurality of LEDs 70' may be aligned with a correspondingly opposed LED 70 of the second plurality of LEDs 70", as illustrated in FIG. 4. In one example, each LED 70 of the first plurality of LEDs 70' may be offset (e.g., longitudinally offset) from a correspondingly opposed LED 70 of the second plurality of LEDs 70" (not shown).

Those skilled in the art will recognize that the LED strip 66 may include additional electronic components including, but not limited to resistors, capacitors, integrated circuits, microprocessors, inductors, relays, transistors, and the like (not shown) electrically connected to the PCB 68. The electronic components may be configured to control and operate an illuminated condition of the LEDs 70. The LED Strip 66 may also include a conductor 82 electrically interconnected between the PCB 68 and a power supply (not shown).

In one example embodiment, the LEDs 70 may be single-color light emitting diodes. As one example, each LED 70 of the first plurality of LEDs 70' and/or the second plurality of LEDs 70" may emit white light. As one example, each LED 70 may emit colored light (e.g., red light, green light or blue light). The LEDs 70 of three primary colors (e.g., red, green and blue) may be mixedly arranged on the PCB 68 in order to achieve a favorable mixture of the colored LEDs to produce a uniform illumination. The light intensity of the primary colors may be mixed and/or varied to produce various other colors (e.g., yellow, orange, purple and the like).

In one example embodiment, the LEDs 70 may be multi-color light emitting diodes. For example and as illustrated in FIG. 4, each LED 70 of the first plurality of LEDs 70' and/or the second plurality of LEDs 70" may be a light emitting diode chip. Each LED 70 may emit two or more colors simultaneously to produce various colors. For example, each LED 70 may include three diodes configured to emit the three primary colors (e.g., red, green and blue). By mixing the three primary colors, a wide variety of colors may be produced.

As a specific, non-limiting example embodiment, the LED 70 may be a chip LED (e.g., the surface-mount device). The LED 70 may be provided with two or more different types of active substances or illuminating material. The LED 70 may include a base and dome-shaped transparent cover or a substantially flat lens. The base may be electrically connected (e.g., surface-mounted) to the surface (e.g., the first major surface 76 or the second major surface 78) of the PCB 68. The Illuminating material may be located in cups integrally formed in the base with common electrodes engaging the illuminating materials. When electrical current is supplied to a first electrode of the LED 70, a first illuminating material may be excited and the LED 70 may emit a first color (e.g., red or white). When electrical current is supplied to a second electrode, a second illuminating material may be excited and the LED 70 may emit a second color (e.g., blue). When electrical current is supplied to both the first electrode and the second electrode, the first illuminating material and the second illuminating material may be excited and the LED 70 may emit third second color (e.g., purple).

In one example embodiment, the LED strip 66 may include a plurality of illuminated conditions. As one example, the first plurality of LEDs 70' and/or the second plurality of LEDs 70" may illuminate continuously. As one example, the first plurality of LEDs 70' and/or the second plurality of LEDs 70" may illuminate intermittently (e.g., flash or pulse). As one example, the first plurality of LEDs 70' and/or the second plurality of LEDs 70" may alternate between continuous illumination and intermittent illumination.

In one example implementation, the first plurality of LEDs 70' and the second plurality of LEDs 70" may illuminate simultaneously. In another example implementation, illumination of the first plurality of LEDs 70' and the second plurality of LEDs 70" may alternate.

In one example embodiment, each LED 70 of the first 70' and second 70" plurality of LEDS may operate independently, concurrently, and/or sequentially with other LEDs 70 of the first plurality of LEDs 70' and/or the second plurality of LEDs 70". In one example implementation, the LEDs 70 of the first plurality of LEDs 70' and/or the second plurality of LEDs 70" may illuminate sequentially. As one example, the LEDs 70 of the first plurality of LEDs 70' and/or the second plurality of LEDs 70" may illuminate sequentially from the first end 72 to the second end 74 of the LED strip 66 and/or from the second end 74 to the first end 72 of the LED strip 66.

In one example implementation, one or more of the LEDs 70 of the first plurality of LEDs 70' and/or the second plurality of LEDs 70" may illuminate in one or more illuminating patterns. As one example, one or more of the LEDs 70 of the first plurality of LEDs 70' and/or the second plurality of LEDs 70" positioned proximate the first (e.g., lower) section 34 of the mast 20 may illuminate in a first pattern (e.g., continuously, intermittently, and/or sequentially) and one or more of the LEDs 70 of the first plurality of LEDs 70' and/or the second plurality of LEDs 70" positioned proximate the second (e.g., upper) section 38 of the mast 20 may illuminate in a second pattern.

As one example, the first pattern may be continuous illumination of the LEDs 70 and the second pattern may be intermittent (e.g., flashing) illumination of the LEDs 70. As one example, the first pattern may include sequential illumination of the LEDs 70 positioned along the first (e.g., lower) section of the mast 20 (e.g., from the first end 26 of the mast 20 to proximate the intermediate location 36 of the mast 20) and the second pattern may include intermittent (e.g., a pulse of) illumination of the LEDs 70 positioned along the second (e.g., upper) section 38 of the mast 20 (e.g., from proximate the intermediate location 36 to the second end 28 of the mast 20) immediately following illumination of the final LED 70 of the sequentially illuminated LEDs 70.

In one example implementation, the LEDs 70 of the first plurality of LEDs 70' and/or the second plurality of LEDs 70" may illuminate at different illuminating intensities. As one example, the intensity (e.g., brightness) of the LEDs 70 may increase along the length of the mast 20 (e.g., from the first end 26 to the second end 28). As one example, the intensity of the LEDs 70 of the first plurality of LEDs 70' and/or the second plurality of LEDs 70" may increase simultaneously, for example, from a minimum intensity to a maximum intensity and then back to a minimum intensity.

In one example implementation, the LEDs 70 of the first plurality of LEDs 70' and/or the second plurality of LEDs 70" may illuminate at different illuminating colors. As one example, the LEDs 70 the first plurality of LEDs 70' and/or the second plurality of LEDs 70" may illuminate intermittently and change color after each illumination cycle. As one example, the illuminating color of the first plurality of LEDs 70' and/or the second plurality of LEDs 70" may change as the LEDs 70 illuminate sequentially along the length of the LED strip 66 (e.g., from the first end 26 to the second end 28 of the mast 20).

Those skilled in the are will recognize that various other illuminated conditions, illuminating patterns, illuminating intensities, and/or illuminating colors are also contemplated and, as such, the examples provided are not meant to limit the present disclosure in any manner.

In one example embodiment, the duration of time one or more LEDs 70 of the first plurality of LEDs 70' and/or the second plurality of LEDs 70" are illuminated and/or the duration of time between illumination of one or more LEDs 70 of the first plurality of LEDs 70' and/or the second plurality of LEDs 70" may vary.

Referring to FIGS. 7 and 11, in one embodiment, the LED strip 66 may include one or more control modules 104 (e.g., integrated circuits and/or microprocessors) for controlling the illuminating conditions (e.g., illuminating patterns, illuminating intensities, illuminating colors, and/or duration of illumination) of the LEDs 70. As one example, electric current (e.g., from the power supply) flowing through the LEDs 70 may be controlled by signals from the control module 104. In this way, it may be possible to vary the pattern, intensity, color and/or duration of illumination of each LED 70 by controlling the current flowing through the corresponding LED 70.

In one example embodiment, the disclosed illuminated support mount 10 may be preprogrammed with one or more illuminating conditions for the first plurality of LEDs 70' and/or the second plurality of LEDs 70". As one example, the control module 104 may be programmed with instructions defining the illuminating conditions of the first plurality of LEDs 70' and/or the second plurality of LEDs 70". The control module 104 may include one or more integrated circuits and/or microprocessors configured to control the illuminating conditions of the first plurality of LEDs 70' and/or the second plurality of LEDs 70". In one example embodiment, and as illustrated in FIG. 7, the control module 104 may be integral to the LED strip 66 (e.g., surface-mounted to the PCB 68). In one example embodiment, and as illustrated in FIG. 11, the control module 104 may be located within the base 18 and may be electrically connected to the LED strip 66.

In one example embodiment, the disclosed illuminated support mount 10 may allow for a user to select one of a plurality of preprogrammed illuminating conditions during operation of the disclosed illuminated support mount 10. As one example, the control module 104 may include one or more switches (not shown) for selection between varieties of illuminating conditions. The switches may be of any suitable type (e.g., slide switch, push-button switch, and the like) and may be located at any location suitable to serve as a user interface (e.g., upon an exterior of the base 18).

As one example, the control module 104 may include one or more switches configured to allow the user to switch between continuous illumination, intermittent illumination, and/or sequential illumination. As one example, the control module 104 may include one or more switches configured to allow the user to control the intensity (e.g., brightness) of the first plurality of LEDs 70' and/or the second plurality of LEDs 70". The control module 104 may also include a switch configured to turn the LED strip 66 ON and OFF (e.g., a power switch).

Referring again to FIG. 4, in one example embodiment, the LED strip 66 may have a length substantially equal to the length of the mast 20. As one example, upon the LED strip 66 being positioned within the hollow interior of the mast 20, the first end 72 of the LED strip 66 may be proximate the first end 26 of the mast 20 and the second end 74 of the LED strip 66 may be proximate the second end 28 of the mast 20 such that the plurality of LEDs 70', 70" extend from proximate the first end 26 to proximate the second end 28 of the mast 20.

In one example embodiment, the LED strip 66 may have a length substantially less to the length of the mast 20 and the LEDs may extend the length of the LED strip 66 (e.g., from the first (e.g., lower) end 72 to the second (e.g., upper) end 74). As one example, the second section 46 (e.g., the lower portion 208) of the mast 20 may be opaque and the LED strip 66 may extend from the second (e.g., upper) end 52 of the first post 46 to the second (e.g., upper) end 56 of the second post 48, such that the LEDs 70 extend from the second end 52 of the first post 46 to the second end 56 of the second post 48.

In one example embodiment, the LED strip may have a length substantially equal to the length of the mast and the LEDs 70 may extend on a portion of the length of the LED strip 66 (e.g., from an intermediate location on the LED strip 66 to the second end 74 of the LED strip 66). As one example, the second section 46 (e.g., the lower portion 208) of the mast 20 may be opaque and the LED strip 66 may extend from the first (e.g., lower) end 50 of the first post 46 to the second (e.g., upper) end 56 of the second post 48, such that the LEDs 70 extend from the second end 52 of the first post 46 to the second end 56 of the second post 48 (e.g., from the intermediate location 36 of the mast 20 (e.g., the first mast interface 80) to the second end 28 of the mast 20).

In one example embodiment, and as best illustrated in FIG. 4, the LED strip 66 may have a length substantially equal to the length of the second post 48. The second end 74 the LED strip 66 may be inserted into the second post 48 through the open first end 54 of the second post 48 such that substantially the entire LED strip 66 is located within the hollow interior of the second post 48. The first end 54 of the second post 48 (e.g., having the LED strip 66 located within the hollow interior of the second post 48) may be inserted into the open second end 52 of the first post 46 such that a portion (e.g., the lower portion) of the second post 48 and a portion (e.g., a lower portion) of the LED strip 66 are positioned within the hollow interior of the first post 46.

Referring to FIG. 6, in one example embodiment, the mast 20 may include an annular lip 84 extending inwardly from an interior surface proximate the first end 26 (e.g., the first end 50 of the first post 46). The lip 84 may be configured to support the first end 54 of the second post 48 and/or the first end 72 of the LED strip 66. The lip 84 may serve to retain the second post 48 at an appropriate longitudinal position relative to the first post 46 and retain the LED strip 66 within the second post 48. The lip 84 may also serve to prevent the second post 48 and/or the LED strip 66 from exiting the first post 46 through the first end 50. The lip 84 may define an opening 85. The opening 85 may be configured to allow the conductor 82 to pass therethrough and enter the base 18.

Referring to FIGS. 2 and 4, in one example embodiment, the first end 26 of the mast 20 (e.g., the first end 50 of the first post 46) may be rotatably connected to the base 18 such that the mast 20 may at least partially rotate about the longitudinal axis A relative to the base 18. In one example, the first end 26 of the mast 20 (e.g., the first end 50 of the first post 46) may include a generally tubular connector member 88. The base 18 may include a generally tubular socket 86 configured to receive the connector member 88.

Referring to FIG. 6, in one example embodiment, the connector member 88 may include an outer diameter d4 less than the outer diameter d5 of the first post 46 (e.g., the lower portion 208 of the mast 20) to define an annular shoulder 92 proximate the first end 26 of the mast 20 (e.g., the first end 50 of the first section 46). In one example, the shoulder 92 may form a substantially planar surface perpendicular to the connector member 88.

In one embodiment, the socket 86 may protrude outwardly (e.g., perpendicularly) from the base 18. The socket 86 may include an outer diameter d6 substantially equal to the outer diameter d5 of the first end 50 of the first post 46 (e.g., the lower portion of the mast 20). The socket 86 may define an opening 94 extending into the base 18. The opening 94 may have an inner diameter d7 in close tolerance with the outer diameter d4 of the connector member 88. Upon the connector member 88 being axially aligned with and received within the opening 94 of the socket 86, the shoulder 92 may engage a substantially planar annular upper surface 96 of the socket 86 to define a second mast interface 98 between the first post 46 (e.g., the mast 20) and the base 18.

In one example embodiment, the connector member 88 may include a plurality of circumferential tabs 90 (e.g., four tabs 90). Each tab 90 may extend away (e.g., along the longitudinal axis A of the mast 20) from the first end 26 of the mast 20 (e.g., the first end 50 of the first post 46). Each tab 90 may be biased to a position generally parallel to the longitudinal axis A of the mast 20 (FIG. 2). The tabs 90 may be sufficiently flexible to deflect inwardly (e.g., radially inward) in response to an inwardly directed force F2 (e.g., a compression force).

In one example embodiment, each tab 90 may include a retainer 100 located at an end thereof opposite the mast 20. As one example, the retainer 100 may include a substantially planar engaging surface 102 extending substantially perpendicularly from an exterior surface of the tab 90. As one example, the retainer 100 may include a guide surface 106 (e.g., a curved surface or a sloped straight surface) extending from the end of the tab 90 to the engaging surface 102.

In one example embodiment, during insertion of the connector member 88 within the opening 94 and upon engagement of the guide surfaces 106 of the retainers 100 and the sidewall of the socket 86 (e.g., exerting force F2), the retainers 100 may deflect the tabs 90 inwardly (e.g., to an unbiased position) such that the connector member 88 fits within the socket 86. Upon the connector member 88 being completely received with the socket 86, the tabs 90 may return to the biased position such that the engaging surface 102 of each retainer 100 contacts and engages an annular region 108 of an interior surface 110 of the base 18 proximate the perimeter of the opening 94.

Thus, the tabs 90 and retainers 100 of the connector member 88 secure the mast 20 (e.g., the first post 46) to the base 18 within the socket 86 and allow the mast 20 to freely rotate about the longitudinal axis A (FIG. 2) relative to the base 18. Allowing the mast 20 to at least partially rotate relative to base 18 may serve to further reduce stresses and vibration applied to the second mast interface 98, such as in response to external force F1 (FIG. 5) (e.g., a load applied to the second post 48 by wind and/or the flag 16 as the vehicle 14 is moving).

Referring to FIGS. 4 and 7, in one embodiment, the mast 20 may include a reinforcing member 130 configured to further strengthen the second mast interface 98. The reinforcing member 130 may be positioned within the first end 26 of the mast 20 (e.g., the first end 50 of the first post 46) and may extend at least partially into the connector member 88.

In one example embodiment, the reinforcing member 130 may include a first (e.g., lower) end 134 and a longitudinally opposed second (e.g., upper) end 136. The reinforcing member 130 may define an opening 132 extending from the first end 134 to the second end 136 for passage of the conductor 82. The opening 132 of the reinforcing member 130 may be axially aligned with the opening 85 defined by the lip 84. In one example, the reinforcing member 130 may be made from a sufficiently durable and rigid material to suitably strengthen the second mast interface 98 between the first end 26 of the mast 20 (e.g., the first end 50 of the first post 46) and the socket 86.

In one example embodiment, and as illustrated in FIG. 4, the reinforcing member 130 may be a cylindrical tube positioned entirely within the connector member 88. As one example, the lip 84 of the mast 20 (e.g., of the first post 46) may contact and engage the second end 136 of the reinforcing member 130 and serve to limit the position of the reinforcing member 130 to within the connector member 88.

In one example embodiment, and as illustrated in FIG. 7, the reinforcing member 130 may be a cylindrical tube positioned partially within the first end 26 of the mast 20 (e.g., the first end 50 of the first post 46) and partially within the connector member 88. As one example, an upper portion 138 of the reinforcing member 130 may have an outer diameter in close tolerance with the inner diameter of the first post 46 (e.g., the lower portion 208 of the mast 20). A lower portion 140 of the reinforcing member 130 may have an outer diameter in close tolerance with an inner diameter of the connector member 88 (e.g. between opposing tabs 90).

In one example embodiment, an interface between the upper portion 138 and the lower portion 140 may define a substantially planar shoulder 142 extending perpendicularly outward from the lower portion 140. The shoulder 142 may contact and engage the lip 84 (e.g., formed by upper ends of the tabs 90) to retain the reinforcing member within the mast 20 (e.g., the first post 46). The inner diameter of the opening 134 defined in the upper portion 138 may be suitably sized to receive the first end 72 of the LED strip 66. The first end 54 of the second post 48 may contact and engage the second end 136 of the reinforcing member 130.

Referring to FIGS. 7-10, in one example embodiment, the base 18 may include an enclosure 112 and a clip 114. The enclosure 112 may include a plurality of walls defining an internal volume 116. In one example, the enclosure 112 may include a front wall 118 and an opposed rear wall 120, a left sidewall 122 and an opposed right sidewall 124, an upper wall 126 and an opposed base wall 128. The socket 86 may extend (e.g., perpendicularly) from the upper wall 126. The opening 94 may extend into the internal volume 116 such that the conductor 82 of the illuminator 24 may enter the base 18.

In one embodiment, the clip 114 may be a generally U-shaped member extending from the enclosure 112. As one example, the clip 114 may extend rearwardly from the rear wall 120. The clip 114 may include a generally planar first (e.g., front) panel 144 and a generally planar second (e.g., rear) panel 146 substantially parallel to the first panel 144. The first 144 and second 146 panels may define a space 149 suitable to receive at least a portion of an upper edge of the window 22 (FIG. 10) of the vehicle 14 (FIG. 1). The clip 114 may also be suitable to connect to any sufficiently thin and flat support structure. As one example, the first 144 and second 146 panels may be configured to engage the inner and outer faces, respectively, of the window 22. The first 144 and second 146 panels may be joined along a common bight 148 with the distance between the panels 144, 146 (e.g., the space 149) being less than the thickness of the window 22 to assure a tight grip engagement with the window 22.

In one example embodiment, a pair of grip pads 150 (FIG. 9) may be connected at opposing positions on the second panel 146 and the first panel 148 and/or the enclosure 112. The grip pads 150 may be made from a generally soft and compressible material. The grip pads 150 may increase friction between the panels 146, 148 and/or the enclosure 112 and the window 22 to reduce movement and/or vibration between the base 18 and the window 22 when the vehicle 14 is moving. As one example, a first grip pad 150 may be connected to an inner surface of an end 147 of the second panel 146 opposite the bight 148 and a second grip pad 150 may be connected to an outer surface of the rear wall 120 proximate the base wall 128.

Referring to FIGS. 1, 2 and 10, in one example embodiment, the light source 24 (e.g., the LED strip 66) may be powered by any suitable power source and/or power supply. As one example, power may be supplied from an external power source through a corded electrical connection (e.g., a power cord 160).

In one example embodiment, the base 18 may include a power input jack 152 (FIG. 10) configured to be electrically connected to a suitable external power supply. As one example, a power cord 160 (FIG. 2) may be electrically connected between the power supply (e.g., a power supply of the vehicle 14 or an external power supply 178) and the light source 24. The power cord 160 may include a first plug 162 configured to be connected to the power input jack 152 and a second plug 164 configured to be connected to the power supply. As one example, and as best illustrated in FIG. 2, the second plug 164 may be 12 VDC plug suitable for electrical connection to a 12 VDC cigarette lighter receptacle in the vehicle 14 (FIG. 1). As another example, the second power plug 164 may be a universal serial bus ("USB") plug suitable for electrical connection to USB receptacle or jack of the vehicle 14. As one example, the first plug 162 may be any suitable DC connector configured to electrically connect to the power input jack 152.

In one example embodiment, the light source 24 the external power supply may include any suitable direct current ("DC") power supply or alternating current ("AC") power supply through the appropriate corded connection (e.g., power cord 160).

Referring to FIG. 11, in one example embodiment, the light source 24 may be powered by the external power supply and/or an internal stored power supply 174 (e.g., a rechargeable battery). As one example, the internal stored power supply 174 may be charged through the corded connection (e.g., power cord 160) with the external power supply via the power input jack 152.

In one example embodiment, the base 18 may include suitable charging circuitry. As one example, the charging circuitry may include, but is not limited to, a battery voltage detector, a battery protector, and a pulsing circuit, for example, disposed on a control module 176. The charging circuitry may also include a transformer and a rectifier for converting AC to DC in applications where such conversion is desired and/or appropriate. The control module 176 may be electrically connected to the power input jack 152 (FIG. 10) and the light source (e.g., LED strip 66) via conductors 82. The control module 176 may include control module 104 or replace the functions of the control module 104, as described herein above.

Referring to FIG. 12, in one example embodiment, the light source 24 (FIG. 2) may be powered by a portable external stored power supply 178. The external stored power supply 178 may be removably connected to the base 18 to provide portable power to the light source 24.

As one example, the external stored power supply 178 may include a battery pack 179 electrically connected to the light source 24. In one example embodiment, the battery pack 178 may include a battery housing 180 configured to hold one or more batteries (not shown). As one example, the battery housing 180 may include a plurality of walls defining an interior volume (not shown). At least one battery (e.g., disposable battery or rechargeable battery) (not shown) may be electrically connected (e.g., via electrical terminals connected to the interior of the battery housing 180) to a power connection cord 182. In one example, a free end of the power cord 182 may include a plug 185. The plug 185 may be configured to be electrically connected to the power input jack 152 (FIG. 10).

In one embodiment, the battery pack 179 may be connected (e.g., removably connected) to the base 18. In one example, the battery pack 179 may include at least one connector 184 configured to be removably connected to the base 18. As one example, the connector 184 may connect the external stored power supply 178 to the enclosure 112 and/or the clip 114 of the base 18. As one example, the connector 184 may be configured to connect to the clip 114 opposite the enclosure 112.

In one example embodiment, and as best illustrated in FIG. 12, the connector 184 may include a generally U-shaped arm 210 extending outwardly from the battery housing 180. As one example, the arm 210 of the connector 184 may hook over and be secured to the bight 148 and at least a portion of the first panel 148 of the clip 114, such as by an interference fit.

In one example (not shown), the connector 184 may include a pair of opposed brackets (not shown). A bracket may extend outwardly (e.g., substantially perpendicularly) from the battery housing 180 at each end. As one example, the brackets may engage opposing sides of the clip 114, such as opposing sides of the second panel 146 (e.g., by an interference fit).

In any embodiment, the connector 184 may be configured to not interfere with connection of the base 18 to the window 22 of the vehicle 14 in a manner as illustrated in FIGS. 1, 10 and 13.

Referring to FIG. 10, in one embodiment, the power input jack 150 may be positioned on the clip 114 such that the power input jack 152 (e.g., the electrical connection with the power supply) is located within the interior cabin of the vehicle 14 when the disclosed illuminated support mount 10 is installed on the window 22 as illustrated in FIGS. 1, 10 and 13. In one example, the power input jack 152 may be positioned proximate the end 147 of the second panel 146 adjacent to the inner face of the window 22. The location of the power input jack 152 (e.g., when the base 18 is connected to the window 22 of the vehicle 14) may allow the power cord 160 (FIG. 2) to be electrically connected from the clip 114 to the power supply outlet of the vehicle 14 to power the light source 24 (FIG. 2) even when the window 22 is fully closed (e.g., "rolled up"). The location of the power input jack 152 (e.g., when the base 18 is connected to the window 22 of the vehicle 14) may also allow the power cord 182 (FIG. 12) to be electrically connected from the clip 114 to the external power supply 178 to power the light source 24 (FIG. 2) when the window 22 is fully closed (e.g., "rolled up") or when the illuminated support mount 10 is removed from the window 22 and carried.

Referring to FIGS. 8-10, in one example embodiment, the power input jack 152 may be enclosed within a housing 154. In one example, the housing 154 may be integral to the exterior surface of the end 147 of the second panel 146. As one example, the housing 154 may be a generally cylindrical tube having a (e.g., generally cylindrical) cavity 170 (FIG. 8), an open left end 156 (FIG. 8) and an open right end 158 (FIG. 10). As one example, the housing 154 may be a generally rectangular tube (FIG. 18) having the cavity 170. Other shapes of the housing 154 and cavity 170 are also contemplated.

In one example embodiment, the power input jack 152 may be positioned within the cavity 170 proximate the open right end 156 of the housing 154 for connection of the first plug 162 of the power cord 160 (FIG. 2). The power input jack 152 may be electrically connected to the light source 24 (e.g., the LED strip 66) via the conductors 82.

Referring to FIGS. 7, 8 and 10, in one embodiment, the clip 114 may define a channel 166 extending from the cavity 170 of the housing 154 to the internal volume 116 of the enclosure 112. In one example, the channel 166 may be generally U-shaped and extend from the cavity 170 (e.g., proximate the open left end 154), through the first panel 144, the bight 148 and the second panel 146 and into the internal volume 116 through an exit opening 168 defined in the enclosure 112. The exit opening 168 may define a passage into the channel 166 from the internal volume 116 for the conductors 82 (FIG. 7) of the light source 24 to pass for electrical connection to the power input jack 152 (FIG. 10). As one example, the opening 168 may be defined in the rear wall 120 proximate the interface between the first panel 148 and the rear wall 120.

In one example embodiment, the channel 166 may be initially exposed through the side of the clip 114. As one example, the free ends of conductors 82 may be fed through the opening 168 after the light source 24 and the mast 20 are connected to the base 18. The power input jack 152 may then be connected to the free ends of the conductors 82. Following connection of the conductors 82 to the power input jack 152, the power input jack 152 may be installed within the cavity 170 of the housing 154 (e.g., through the open left end 156) and the conductors 82 may be inserted within the channel 166.

Referring to FIG. 9, in one embodiment, at least one cover 172 may be connected (e.g., by adhesives, ultrasonic welding or the like) to the clip 114 and the housing 154. The cover 172 may be sufficiently sized and shaped to fully enclose the channel 166 and the open left end 156 of the cavity 170 following installation of the power input jack 152 within the housing 154. In one example, the cover 172 may be a generally thin strip of material (e.g., made from substantially the same material as the base 18, such as plastic) having a size and shape substantially matching the size and shape of the channel 166 and the open left end 156 of the housing 154. In one example, the cover 172 may include two parts or cover members, a first part having a size and shape substantially matching the size and shape of the channel 166 and a second part having a size and shape substantially matching the size and shape of the open left end 156 of the housing 154.

Referring to FIG. 11, in one example embodiment, the base 18 may include a second illuminator 186. In one example, a pair of second illuminators 186 may be positioned on the upper wall 126 of the enclosure 112 on opposite sides of the socket 86. The second illuminator 186 may include one or more LEDs 188 housed within a lens 190 or similar transparent cover. The LEDs 188 may be electrically connected to the control module 176 and the power input jack 154 (FIG. 10) via conductors 82.

Referring to FIG. 12, in one example embodiment, the base 18 may include one or more struts 192. As one example, the struts 192 may extend from the socket 86 to the upper wall 126 of the enclosure 112 to resist pivotal movement of the socket 86 and the mast 20 (FIG. 2) relative to the base 18, such as in response to external force F1 (FIG. 5).

Referring to FIGS. 13-16, in another embodiment, the base 18 may include a generally planar platform 194 (FIG. 14). The flag support 12 (FIG. 13) may be connected to the platform 194 of the base 18. The base 18 may be mounted or otherwise connected to the motor vehicle 14 (e.g., to the vertically adjustable side window 22 of the motor vehicle 14), as illustrated in FIG. 13.

Referring to FIG. 14, the platform 194 may include a first (e.g., front) end 212 (FIG. 14) and an opposed second (e.g., rear) end 214 (FIG. 14). The clip 114 may extend from the platform 194. As one example, the clip 114 may extend from the second end 214 of the platform 194. As one example, the clip 114 may be integrally formed or otherwise connected to the platform 194.

In one example embodiment, the clip 114 (e.g., the first panel 144 of the clip 114) may be disposed at a non-zero angle relative to the platform 194. As one example, the clip 114 may be disposed at an angle of about 90 degrees with respect to the platform 194. As one example, the clip 114 may be disposed at an angle of less than 90 degrees (e.g., approximately between 45 and 90 degrees) with respect to the platform 194. As one example, the clip 114 may be disposed at an angle of more than 90 degrees (e.g., approximately between 90 and 135 degrees) with respect to the platform 194. The exact angle between the platform 194 and the clip 114 may depend on the position of the flag support 12 (e.g., the mast 20) upon the platform 194.

The socket 86 may extend (e.g., perpendicularly) from an upper (e.g., top) surface 204 of the platform 194. The mast 20 may be received within the socket 86, as described herein above.

In one example embodiment, the platform 194 may define an internal volume 196. The internal volume 196 may be in communication with the opening 94 of the socket 86 to receive a portion of the mast 20. In one example, the internal volume 196 may be suitably sized to receive at least a portion of the connector member 88 of the mast 20 (e.g., the first post 46) (FIG. 4). As one example, the internal volume 196 may be sufficiently sized to receive the lower ends of the tabs 90 such that the engaging surfaces 102 of the retainers 100 (FIG. 6) may contact and engage an annular region 198 of an interior surface 200 (e.g., defining the internal volume 196) of the platform 194. In one example, the internal volume 196 may be sufficiently sized to receive the conductors 82 such that the conductors 82 (e.g., an electrical connection between the light source 24 and the power input jack 152) may extend through the base 18 (e.g., the platform 194) and into the channel 166. As one example, the channel 166 may extend through the clip 114 and into the base 18 (e.g., the platform 194) at least to the opening 94 of the socket 86 to receive the electrical connection between the light source 24 and the power input jack 152.

In one example embodiment, the platform 194 may include an exit opening 202 to provide access for the conductors 82 of the light source 24 (FIG. 15) to pass from the internal volume 196, through the channel 166 defined in the clip 114 and to the power input jack 154 (FIG. 16).

Referring to FIGS. 15 and 16, in one example embodiment, the first end 26 of the mast 20 may be rigidly connected to the base 18. As one example, the first end 50 of the first post 46 may be rigidly connected to an upper surface 204 of the platform 194. As one example, the socket 86 may extend upwardly from the upper surface 204 of the platform 194 to define the first section 34 of the mast 20 (e.g., the first post 46).

In one example embodiment, the base 18 may include one or more struts 192 (FIG. 15). As one example, the struts 192 may extend from the mast 20 (e.g., the first post 46) proximate the first end 26 to the upper surface 204 of the platform 194 to resist pivotal movement of the mast 20 relative to the base 18, such as in response to external force F1 (FIG. 5).

In the example embodiments illustrated in FIGS. 13-16, the mast 20 may rotate relative to the base 18 (e.g., the platform 194) or may be fixed relative to the base 18. In one example, and as illustrated in FIG. 15, the lower end 26 of the mast 20 may be rigidly connected to the base 18 (e.g., the platform 194). As one example, the lower section 34 of the mast 20 may be rigidly connected to the base 18. As one example, the lower end 50 of the first post 46 may be rigidly connected to the base 18. In either example, the upper section 38 of the mast 20 may be fixed relative to the lower section 34. As one example, the second post 48 may be received within, such as described herein above, and fixedly connected to the lower post 46.

Referring to FIGS. 16 and 17, in one example embodiment, the external power supply 178 may be connected (e.g., removably connected) to an end of the clip 114. As one example, the external power supply 178 may be connected to and extend away from the end 147 of the second panel 146 of the clip 114.

In one example, the connector 184 of the external power supply 178 may be connected to the end 147 of the second panel 146 of the clip 114. As one example, the clip 114 may include a clamp 216 disposed at the end 147 of the second panel 146. The clamp 216 may mate with and/or engage the connector 184.

Referring to FIGS. 17 and 18, in one example, the clamp 216 may include a groove 218 and the connector 184 may include a tongue 220, for example, forming a tongue and groove connection between the external power supply 178 and the base 18 (e.g., the clip 114). As one example, the tongue 220 may be slidingly engaged within the groove 218 (e.g., slidingly received by the clamp 216). The clamp 216 may define a slot 222 accessing the groove 218 through which the tongue 220 extends. The groove 218 may have a cross-sectional shape and/or dimension in close tolerance to the external cross-sectional shape and/or dimension of the tongue 220 such that the tongue 220 fits snugly within the groove 218 (e.g., by a friction fit). As one example, and as illustrated in FIGS. 17 and 18, the cross-sectional shape of the groove 218 and the tongue 220 may be generally circular. Other cross-sectional shapes of the groove 218 and the tongue 220 are also contemplated.

Referring to FIG. 16, in one example embodiment, a jumper cord 224 may electrically interconnect the external power supply 178 and light source 24. As one example, the jumper cord 224 may include a first plug 224 configured to be connected to the power input jack 152 and an opposed second plug 228 configured to be connected to a power jack 230 of the external power supply 178.

Referring to FIGS. 16 and 18, the removable connection (e.g., the tongue and groove connection) between the base 18 and the external power supply 178 may include one or more interference features to retain the external power supply 178 at a selected position relative to the base 18. In one example, the connector 184 and the clamp 216 may each include corresponding and mating interference features. As one example, the clamp 216 may include a protrusion 232 extending radially inward within the groove 218 and the connector 184 may include a recess 234 disposed in the tongue 220. Upon the tongue 220 being slidingly inserted within the groove 218, the protrusion 232 may mate with (e.g., be at least partially received within) the recess 234 to hold the tongue 220 at a linear position within the groove 218 and prevent linear movement of the external power supply 178 relative to the base 18.

Referring to FIGS. 7 and 11, in one embodiment, the control module 104 and/or the control module 176 may include a sensor 238 configured to sense one or more external environmental conditions. In one example, the sensor 238 may be a photodetector or photosensor configured to detect the light condition proximate the illuminated support mount 10. As one example, the sensor 238 (e.g., photodetector) may detect a low light condition and transmit a signal to the control module 104 or control module 176 that initiates the illuminating and/or operating conditions of the light source 24 (e.g., powers ON the light source 24, adjusts the intensity of the LEDs 70, etc.). In one example, the sensor 238 may be a sound detector or sound sensor configured to receive sounds proximate the illuminated support mount 10. As one example, the sensor 238 may detect sound and transmit a signal to the controller 104 or controller 176 that initiates the illuminating condition of the light source 24 (e.g., powers ON the light source 24). As one example, the sensor 238 (e.g., sound detector) may receive sounds (e.g., music) and the control module 104 and/or control module 176 may interpret (e.g., process) the sounds to control the operating conditions of the light source 24 (e.g., adjusts the intensity of the LEDs 70, adjusts the illumination pattern of the LEDs 70 etc.) in order to coincide with the music.

In one example embodiment, the control module 104 and/or the control module 176 may include a short-range communication device 236. In one example, the short-range communication device 236 may be configured to wirelessly communicate with a transmitter. As one example, the short-range communication device 236 may be any suitable receiver configured to detect and process radio waves (e.g., an radio frequency signal). As one example, the short-range communication device 236 may be a Bluetooth® device. In one example, a remote transmitter (not shown) may wirelessly communicate with the control module 104 and/or control module 176 (e.g., via the short-range communication device 236) to control the illuminating and/or operational conditions of the light source 24. As one example, the remote transmitted may be a smartphone including a software application having instructions that, when executed by a processor of the smartphone, causes the smartphone to generate a control signal (e.g., a Bluetooth® communication signal) that controls the illuminating and/or operational conditions of the light source 24.

Referring to FIG. 19, in one example embodiment, the illuminated support mount 10 may include an illuminated attachment 240 configured to be connected to the flag support 12. In one example, the illuminated attachment 240 may include a housing 242 and a plurality of illuminators 244 (e.g., LEDs) disposed on the housing 242. As one example, the housing 242 may include a suitable through hole (e.g., channel) extending therethough for receiving the mast 20 (e.g., the post 21). As one example, the housing 242 may include a clip or clamp (not shown) configured to engage around the mast 20 to secure the illuminated attachment 240 to the flag support 12. The illuminated attachment 240 may include an internal power supply (e.g., battery) (not shown) or may be electrically connected to the illuminated support mount 10 or external power supply, for example, by a jumper cord. The housing 242 may have various shapes, for example, the housing 242 may include the shape of a sports ball (e.g., a football, baseball, etc.), a sports team's logo (e.g., a tiger paw, a star, etc.), a corporate logo, or the like.

Referring generally to FIGS. 1-18, and particularly to FIG. 4, in any example embodiment disclosed herein, the light source 24 may be a preassembled component of the disclosed illuminated support mount 10. In one example, the LED strip 66 may be an interchangeable component of the illuminated support mount 10 without altering or otherwise modifying a process utilized in manufacturing the illuminated support mount 10. As one example, the plurality of LEDs 70 (e.g., the illuminators 44) of a preselected type, color, etc. may be mechanically and electrically connected (e.g., surface mounted) to the PCB 68 and the control module 104 may be preprogrammed with a variety of illuminating and/or operating conditions (e.g., pattern, intensity, color and/or duration of illumination of each LED 70). The assembled and programmed light source 24 (e.g., the LED strip 66) may be integrated within the mast 20 (e.g., received within the post 21 or first post 46 and second post 48) and electrically connected to the power input jack 152.

Such a configuration may be particularly beneficial to the manufacturing process of the illuminated support mount 10 by significantly reducing costs, increasing cycle time, simplifying the manufacturing process, and/or providing a level of modularity to the illuminated support mount 10. As one example, a variety of preassembled and preprogrammed light sources 24 may be seamlessly integrated into the manufacturing process to produce illuminated support mounts 10 having a variety of illuminating and/or operating conditions.

Accordingly, the disclosed illuminated support mount 10 may provide an illuminated and attention-grabbing alternative to traditional car flags, particularly in low light or dark conditions. The disclosed illuminated support mount 10 may also provide a user with a portable display, for example, the disclosed illuminated support mount 10 may be carried from a tailgate into the stadium. Additionally, the disclosed illuminated support mount 10 may be utilized as a vehicle identifier, for example, as used on a commercial vehicle or vehicles located at an automobile dealership as advertising and/or promotional displays.

Although various aspects of the disclosed illuminated support mount for vehicle flags have been shown and described, modifications may occur to those skilled in the art upon reading the specification. The present application includes such modifications and is limited only by the scope of the claims.

What is claimed is:

1. An illuminated support mount for a vehicle flag comprising:
   a base;
   a tubular mast having a longitudinal axis and comprising a first end connected to said base and a second end, wherein said mast is substantially transparent; and
   an LED strip light located within said mast, wherein said LED strip light comprises:
      a plurality of first light emitting diodes extending along said longitudinal axis of said mast and configured to emit light through said mast in a first direction perpendicular to said longitudinal axis; and
      a plurality of second light emitting diodes extending along said longitudinal axis of said mast laterally opposed to said plurality of first light emitting diodes and configured to emit light through said mast is a second direction, opposite said first direction, perpendicular to said longitudinal axis.

2. The illuminated support mount of claim 1 further comprising:
   a clip extending from said base; and
   a power input jack proximate to an end of said clip and electrically coupled to said LED strip light, wherein:
   said clip is configured to be connected to a window of a vehicle such that said power input jack is positioned within an interior of said vehicle and said base is positioned on an exterior of said vehicle, and
   an electrical connection between said power input jack and said LED strip light extends through said clip and said base.

3. The illuminated support mount of claim 2 wherein:
   said base defines an internal volume,
   said clip comprises an internal channel extending from said internal volume to said power input jack, and
   said electrical connection between said power input jack and said LED strip light extends through said internal volume and said internal channel.

4. The illuminated support mount of claim 1 further comprising a battery pack configured to be removeably connected to said base and electrically coupled to said LED strip light.

5. The illuminated support mount of claim 4 wherein:
   said battery pack comprises:
      a battery housing configured to retain a battery; and
      a connector projecting from said battery housing, and
   said base comprises a clamp configured to releasably engage said connector to removably connect said battery housing to said base.

6. The illuminated support mount of claim 4 wherein:
   said clamp comprises an elongated C-shaped body defining a groove, having a circular cross-sectional shape, and a slot, having a rectangular cross-sectional shape, accessing said groove,
   said connector comprises a stem, having a rectangular cross-sectional shape, projecting from said battery housing and an elongated tongue, having a circular cross-sectional shape, connected to said stem, and
   said tongue is configured to be slidably received within said groove with said stem extending through said slot.

7. The illuminated support mount of claim 6 wherein:
   said clamp further comprises a protrusion extending radially inward within said groove,
   said tongue comprises a circumferential recess, and
   said protrusion is configured to mate within said recess to restrict linear movement of said tongue within said groove.

8. The illuminated support mount of claim 1 wherein:
   said LED strip light further comprises a printed circuit board extending from proximate to said first end of said mast to proximate to said second end of said mast,
   said plurality of first light emitting diodes comprises first light emitting diode chips surface mounted to a first major surface of said printed circuit board, and
   said plurality of second light emitting diodes comprises second light emitting diode chips surface mounted to a second major surface of said printed circuit board.

9. The illuminated support mount of claim 1 wherein said mast is at least partially rotatable about said longitudinal axis relative to said base.

10. The illuminated support mount of claim 9 wherein:
    said mast further comprises a connector member at said first end of said mast, and
    said connector member is connected to said base and is at least partially rotatable about said longitudinal axis relative to said base.

11. The illuminated support mount of claim 10 wherein:
    said connector member comprises a plurality of tabs extending longitudinally from said first end of said mast, each tab of said plurality of tabs comprising a radially outward extending retainer,
    said base comprises a socket defining an opening into said internal volume, and
    said socket is configured to receive said connector member such that said retainer engages an annular region of said base within said internal volume proximate said opening to restrict linear movement of said connector member along said longitudinal axis within said socket and enable said connector member to at least partially rotate about said longitudinal axis within said socket.

12. The illuminated support mount of claim 1 wherein:
    said mast further comprises a radially inward projecting lip at said first end of said mast, and
    said lip is configured to retain a longitudinal position of said LED strip light within said mast.

13. An illuminated support mount for a vehicle flag comprising:
    a base;
    a clip extending from said base;
    a power input jack disposed at an end of said clip;
    a channel extending from said power input jack, through said clip, and into said base;
    a tubular mast having a longitudinal axis and comprising a first end connected to said base and a longitudinally opposed second end, wherein said mast is substantially transparent; and
    an LED strip light located within said mast, said LED strip light being electrically coupled to said power input jack via an electrical connection extending through said channel, wherein said LED strip light comprises:
       a plurality of first light emitting diodes extending along said longitudinal axis of said mast and configured to emit light through said mast in a first direction perpendicular to said longitudinal axis; and
       a plurality of second light emitting diodes extending along said longitudinal axis of said mast laterally opposed to said plurality of first light emitting diodes and configured to emit light through said mast is a second direction, opposite said first direction, perpendicular to said longitudinal axis, wherein said clip is configured to be connected to a window of a vehicle such that said power input jack is positioned within an interior of said vehicle and said base is positioned on an exterior of said vehicle.

14. The illuminated support mount of claim 13 further comprising a battery pack configured to be removably connected to said clip and electrically coupled to said power input jack.

15. The illuminated support mount of claim 14 wherein:
said battery pack comprises:
    a battery housing configured to retain a battery; and
    a connector projecting from said battery housing, and
said clip comprises a clamp located at said end of said clip and configured to releasably engage said connector to removably connect said battery housing to said clip.

16. The illuminated support mount of claim 15 wherein:
said clamp comprises an elongated C-shaped body defining a groove, having a circular cross-sectional shape, and a slot, having a rectangular cross-sectional shape, accessing said groove,
said connector comprises a stem, having a rectangular cross-sectional shape, projecting from said battery housing and an elongated tongue, having a circular cross-sectional shape, connected to said stem, and
said tongue is configured to be slidably received within said groove with said stem extending through said slot.

17. The illuminated support mount of claim 16 wherein:
said clamp further comprises a protrusion extending radially inward within said groove,
said tongue comprises a circumferential recess, and
said protrusion is configured to mate within said recess to limit linear movement of said tongue within said groove.

18. The illuminated support mount of claim 14 wherein said battery pack comprises:
a battery housing configured to retain a battery; and
an arm, having an inverted U shape, projecting from said battery housing, wherein said arm is configured to hook over a bight of said clip to removably connect said battery housing to said clip.

19. The illuminated support mount of claim 13 wherein:
said LED strip light comprises a printed circuit board extending from proximate to said first end of said mast to proximate to said second end of said mast and operatively coupled to said power input jack;
said plurality of first light emitting diodes comprises first light emitting diode chips surface mounted on a first major surface of said printed circuit board and electrically coupled directly to said printed circuit board,
said plurality of second light emitting diodes comprises second light emitting diode chips surface mounted on a second major surface of said printed circuit board and electrically coupled directly to said printed circuit board.

20. The illuminated support mount of claim 13 wherein said mast is at least partially rotatable about said longitudinal axis relative to said base.

\* \* \* \* \*